United States Patent [19]
Worley

[11] Patent Number: 6,022,012
[45] Date of Patent: Feb. 8, 2000

[54] MODULAR AUTOMATIC DOCUMENT FEEDER FOR A FLAT BED INPUT DEVICE

[75] Inventor: A. Justine Worley, Murrieta, Calif.

[73] Assignee: Hewlett-Packard Company, Palo Alto, Calif.

[21] Appl. No.: 09/041,844

[22] Filed: Mar. 12, 1998

[51] Int. Cl.$^7$ .............................. B65H 5/22; B65H 83/00; B65H 85/00
[52] U.S. Cl. ......................................... 271/3.14; 271/4.01
[58] Field of Search .................................. 271/3.14, 4.01, 271/4.08, 4.1, 10.01, 10.09, 10.11, 145, 161, 207, 209; 399/110, 124, 367, 369, 379, 365, 377, 361

[56] References Cited

U.S. PATENT DOCUMENTS

| | | | |
|---|---|---|---|
| 4,349,186 | 9/1982 | Nakamura | 271/18 |
| 4,990,952 | 2/1991 | Watanabe . | |
| 5,140,438 | 8/1992 | Kurahashi et al. . | |
| 5,320,436 | 6/1994 | Hock et al. | 400/283 |
| 5,326,090 | 7/1994 | Hock et al. | 271/162 |
| 5,630,597 | 5/1997 | Minami et al. | 271/3.5 |
| 5,686,950 | 11/1997 | Hirakue | 347/104 |
| 5,709,382 | 1/1998 | Shima | 271/209 |

FOREIGN PATENT DOCUMENTS

| | | | |
|---|---|---|---|
| 0536777 | 4/1993 | European Pat. Off. . | |
| 401053946 | 3/1989 | Japan | 271/4.1 |
| 403115034 | 5/1991 | Japan | 271/4.01 |
| 405069957 | 3/1993 | Japan | 271/207 |
| 405078003 | 3/1993 | Japan | 271/207 |
| 405139598 | 6/1993 | Japan | 271/4.08 |
| 406191649 | 7/1994 | Japan | 271/161 |

*Primary Examiner*—William E. Terrell
*Assistant Examiner*—K W Bower
*Attorney, Agent, or Firm*—Jerry R. Potts

[57] ABSTRACT

An automatic document feeder is constructed of three chassis. A main chassis carries the active components, such as paper pick and drive mechanisms for sequentially picking and delivering said sheets to and from a flat bed scanner, motors, and transmissions for driving said paper pick and drive mechanisms, a document backing assembly, and electronic controller equipment. Moreover, the main chassis provides a document input tray. A lower chassis forms a low height form factor output tray, using paper stiffness caused by predetermined bending to register the document sheets without having to support the full length thereof. When assembled with an upper chassis, the three chassis provide the entire paper path. The lower chassis carries an attachment hinge mechanism for mounting the automatic document feeder appropriately to a flat bed scanner apparatus. The paper loading and unloading drive mechanism provides a balance normal force from a plurality of paper drive rollers. The paper loading and unloading drive mechanism is used to lift the document backing assembly from the flat bed scanner during loading and unloading of document sheets.

9 Claims, 36 Drawing Sheets

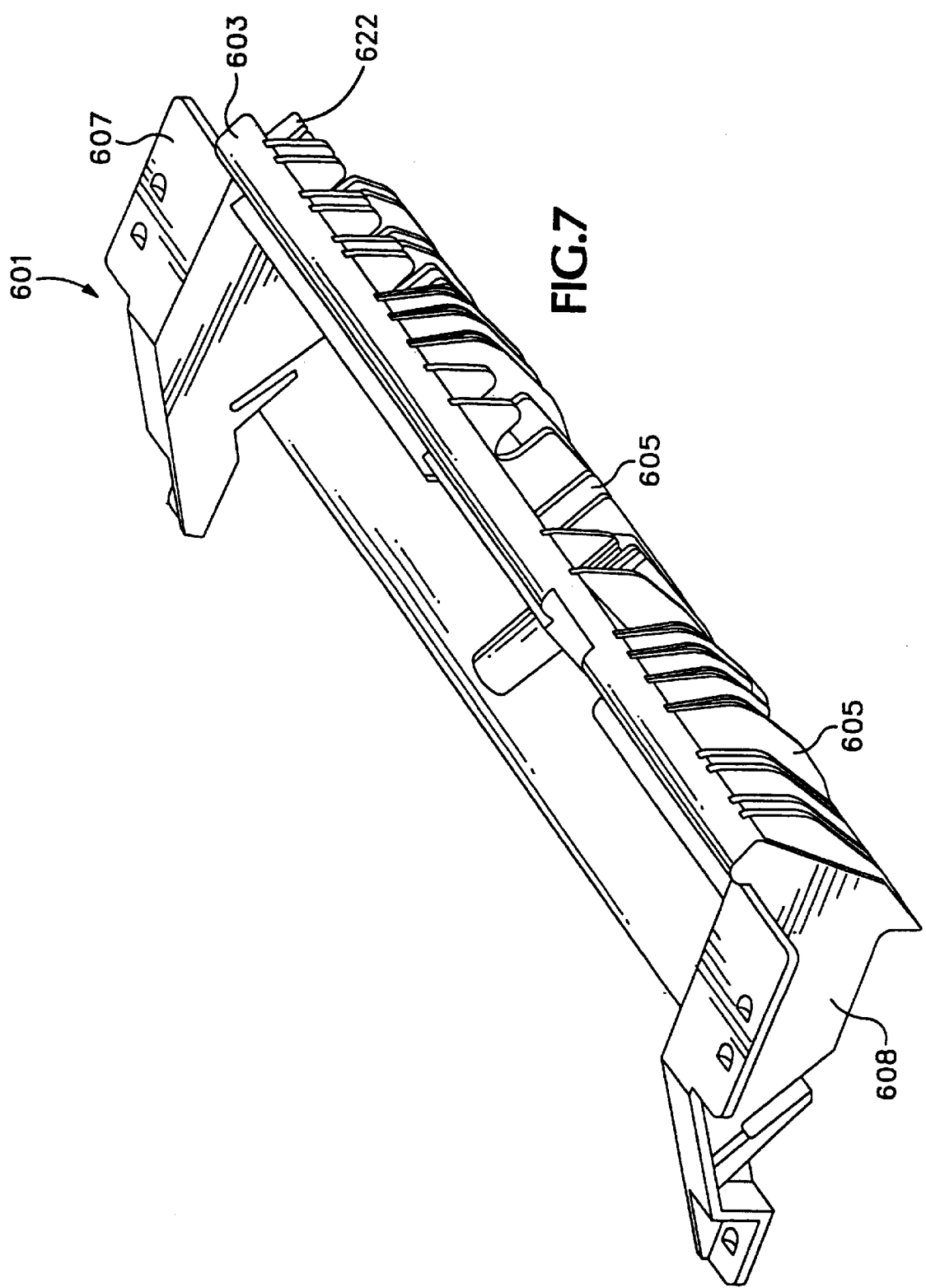

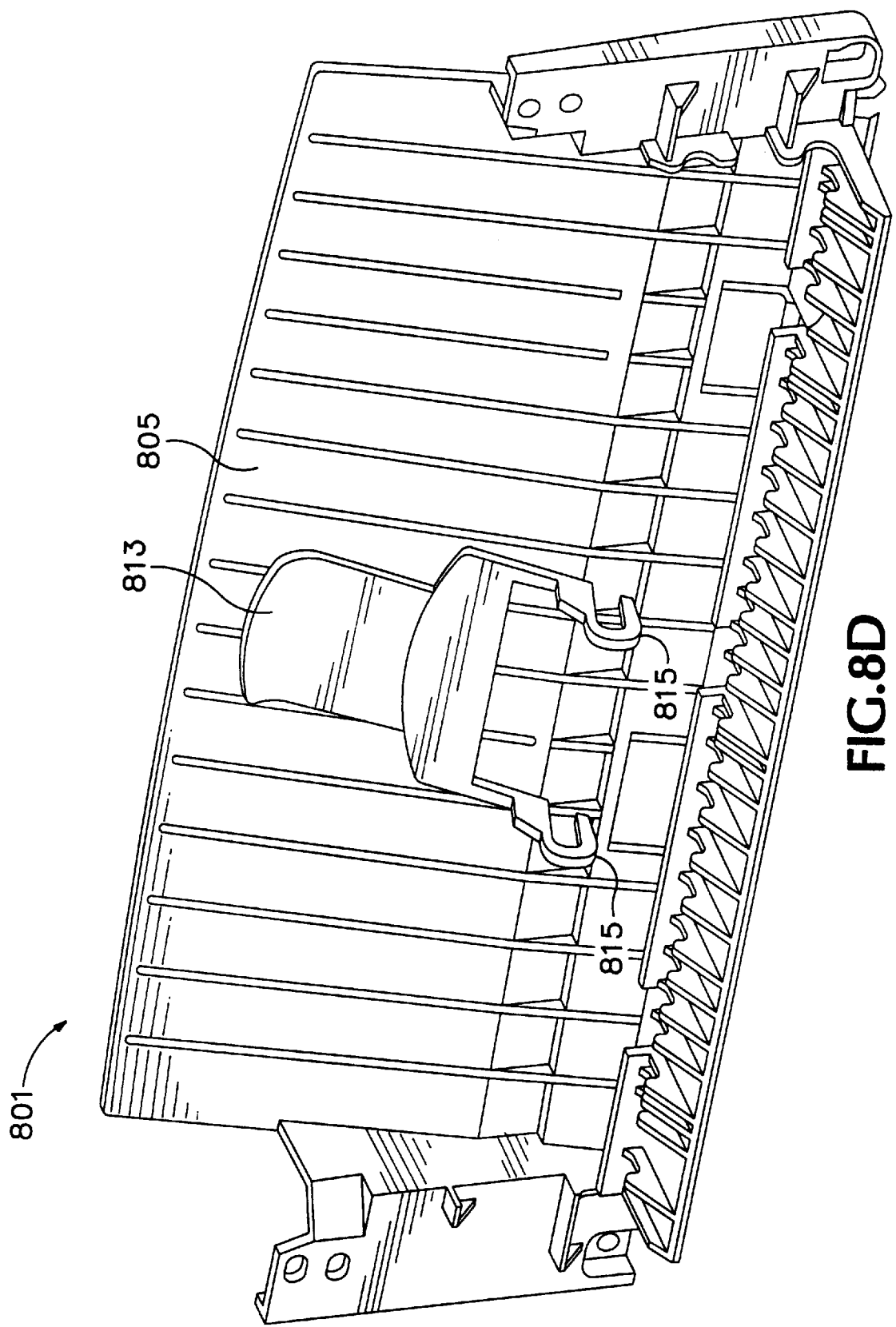

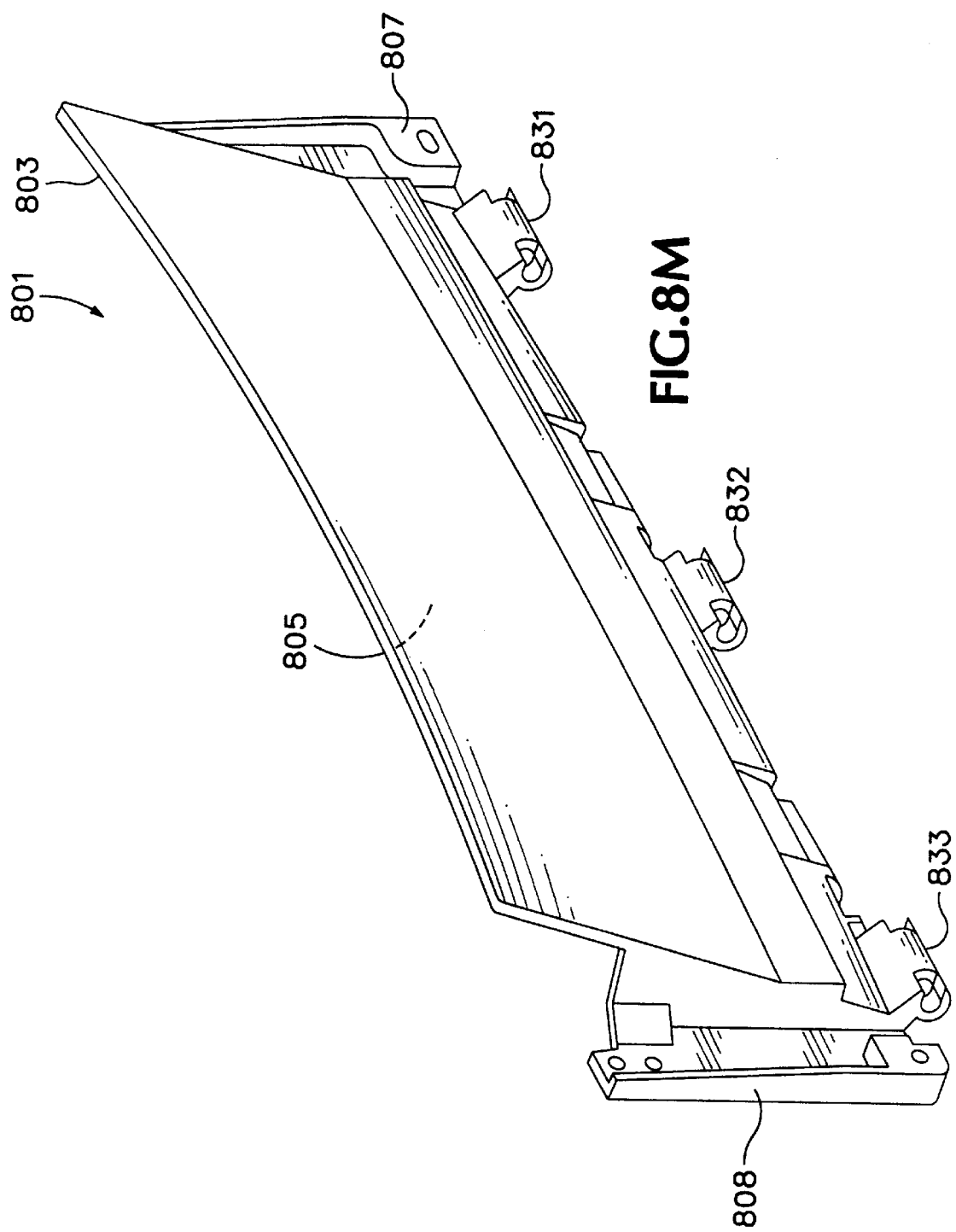

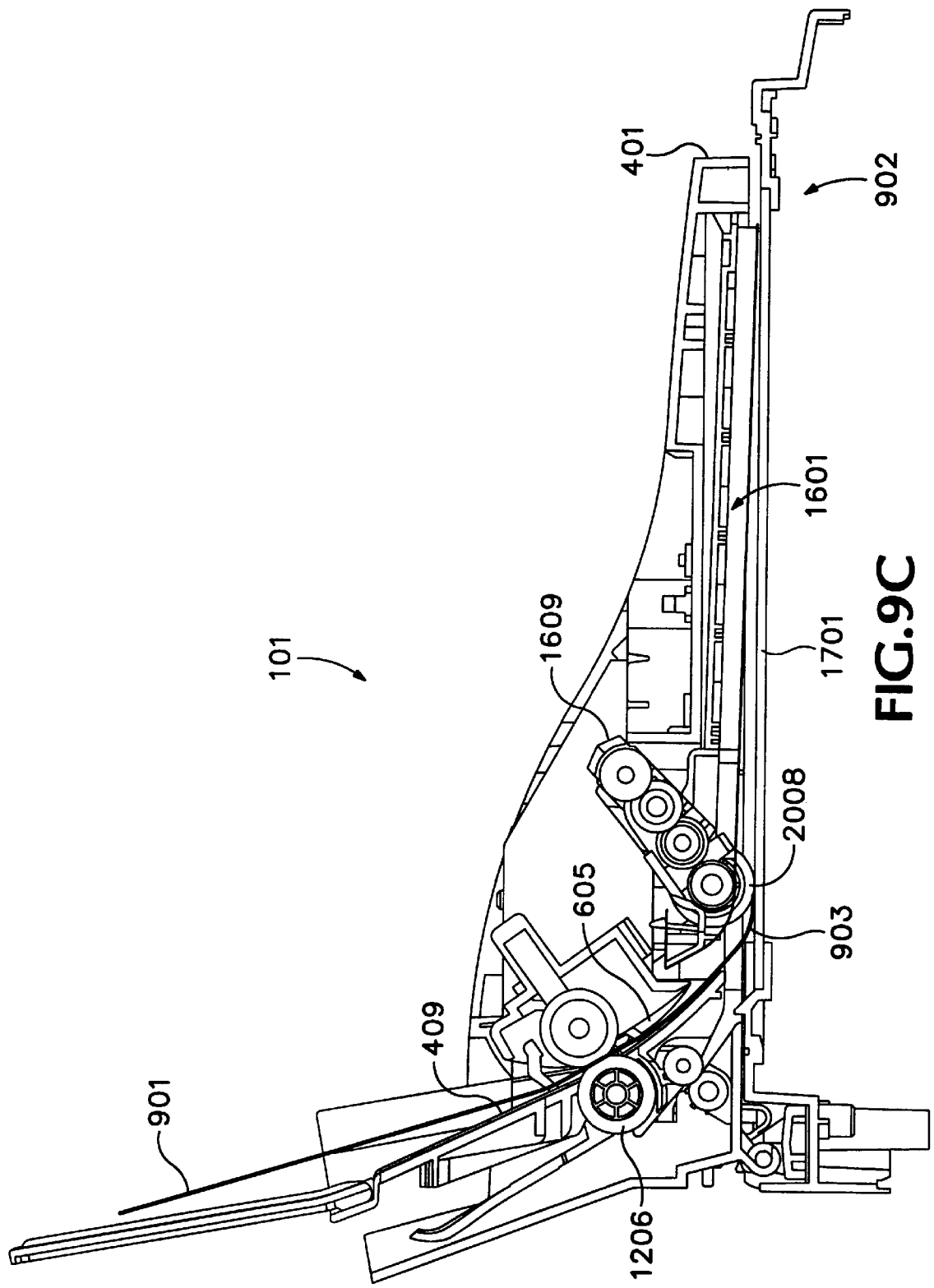

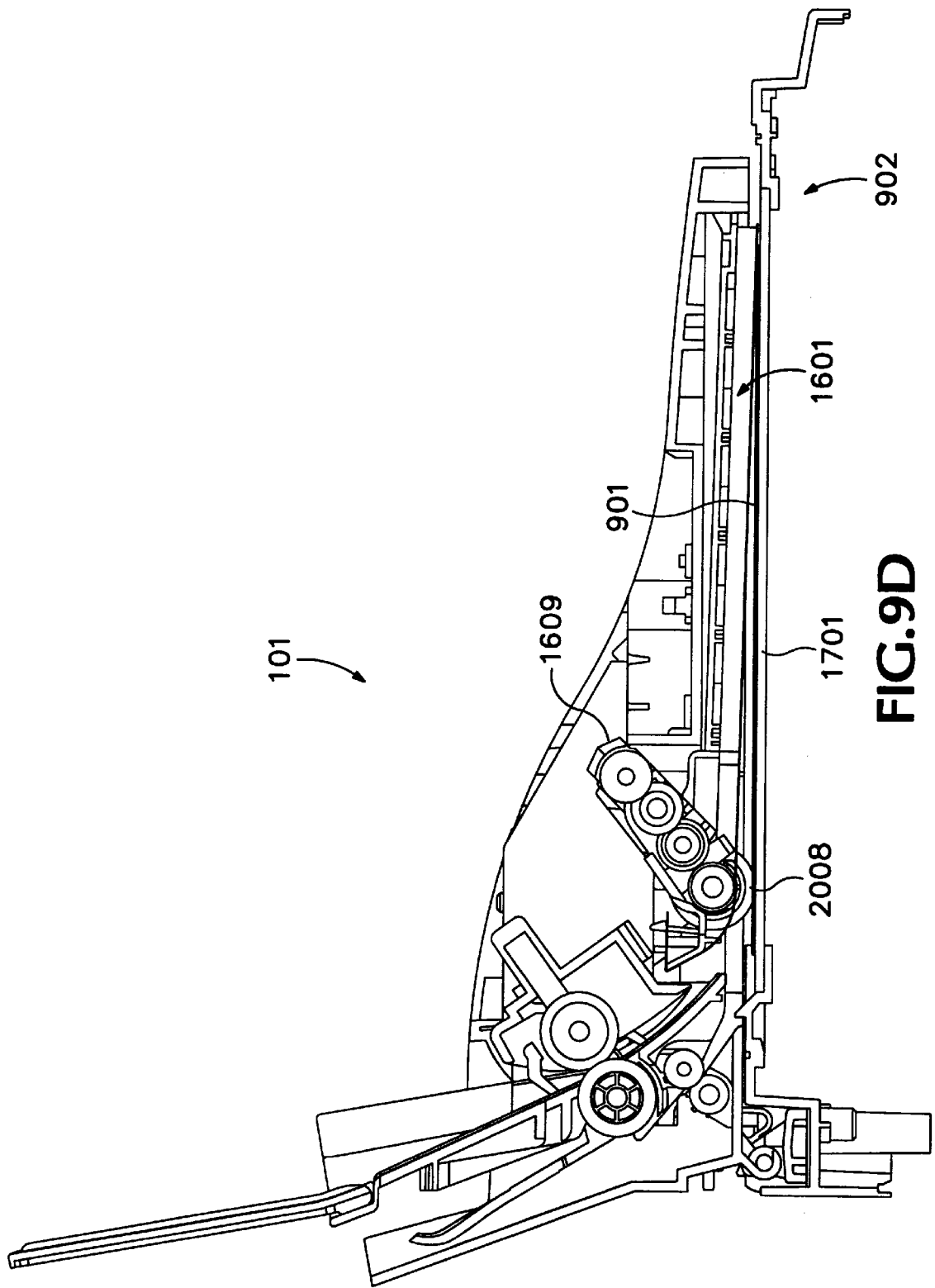

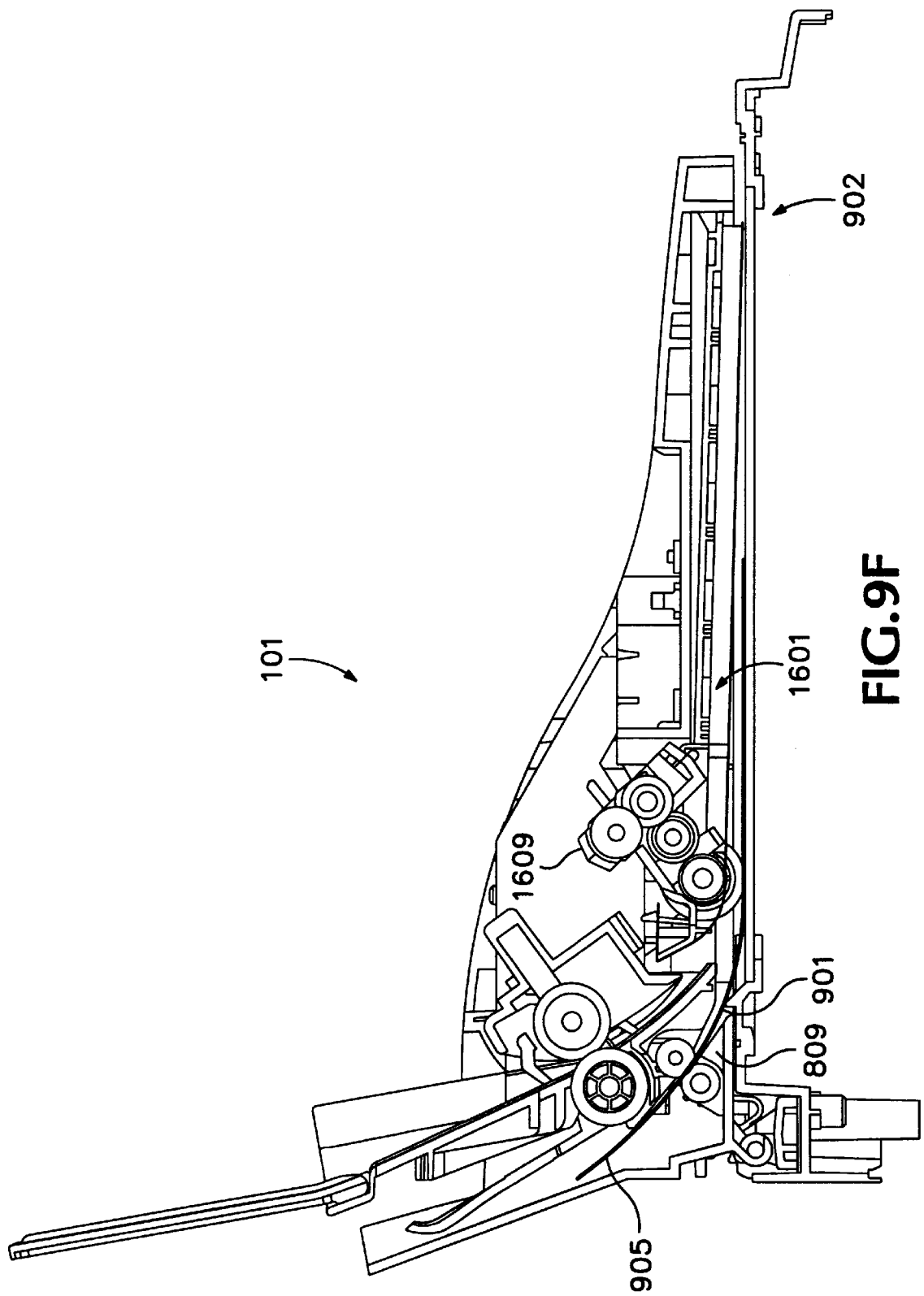

TO FIG.10B

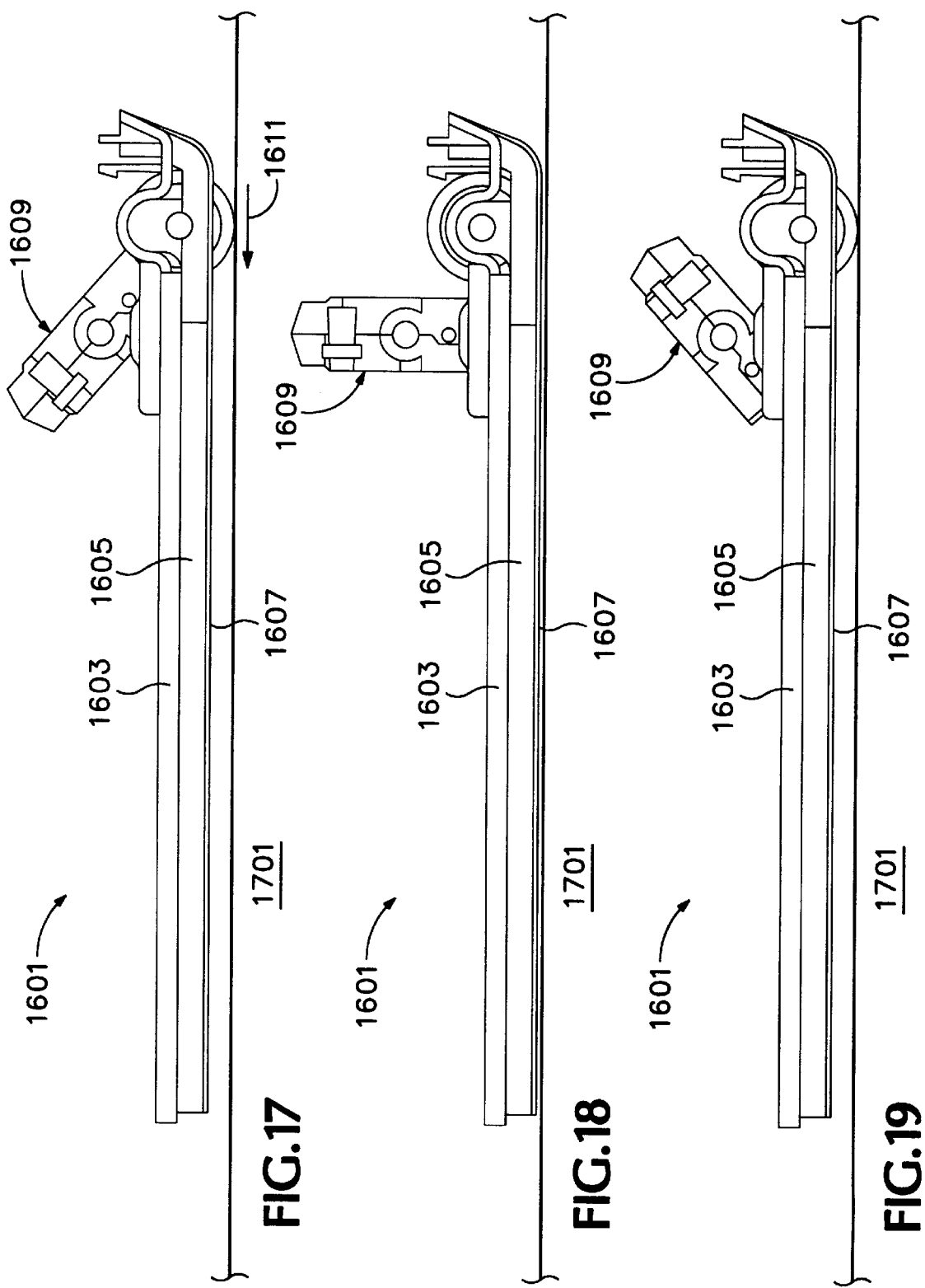

MODULAR AUTOMATIC DOCUMENT FEEDER FOR A FLAT BED INPUT DEVICE

RELATED APPLICATIONS

This application is related to co-pending utility patent application Ser. No. 09/041,846, by Worley, et al. entitled "document Backing Lift Mechanism For Automatic Document Feeder" co-filed herewith.

BACKGROUND OF THE INVENTION

1. Field of the Invention

The present invention relates generally to hard copy document apparatus and, more particularly, to cut sheet print media automatic document feeders.

2. Description of Related Art

Automated business machines for producing or reproducing hard copy documents, such as copiers, printers, telecommunications facsimile machines, document scanners, and the like, are well known commercially. Ideally, when working with cut sheet print media, a copying apparatus often includes an automatic document feeder ("ADF") mechanism for automatically loading and unloading single sheet sequentially to a functional station where the copying apparatus performs an operation—e.g., sequentially scans the fed document sheets for copying, faxing, displaying on a computer monitor, or the like. Following the operation, the ADF then off-loads that sheet and feeds the immediately following sheet of the document to the functional station. A sequential flow of sheets by the ADF and positioning without the necessity of manual handling reduces the time required to accomplish the complete functional operation. Media which already contains printed matter (hereinafter referred to generically as a "document") presents a need for precise alignment to a scanning station in order to generate a true copy.

Two major problems associated with business machines that include an ADF are the occasional mis-feed, commonly known as a "paper jam," and a multiple sheet feed. Paper jams interrupt operation and require manual correction of the problem before the automated conveying can be restarted. Multiple sheet feed can result in a missing page in the copy.

Typical commercial ADFs generally require a document sheet pre-picking mechanism to ensure a single sheet gets to a pick roller, especially in systems having a horizontal input paper tray. Most commercial ADFs for scanners scroll the document page-by-page passed a stationary scan head and into an output tray. However, this makes prescanning and other multiple scanning operations difficult or even impossible, leading to degraded scan output quality.

Belt type document feeders have been adapted to place a document onto a flat, transparent, scanning bed. One such system is shown in U.S. Pat. No. 5,342,133 (Canfield), assigned to the common assignee of the present invention.

A beltless drive system is demonstrated in allowed U.S. patent application Ser. No. 08/651,066 (Hendrix), assigned to the common assignee of the present invention.

A third common problem is the inadvertent skewing of the document page in the loading and unloading of paper sheets on the glass of a scanner or copier. Skewing can often lead to a paper jam. A first prior art method is to affix a paper drive mechanism axle to the ADF structure and turn the axle with a motor and gear train or timing belt linkage. The motor and the linkage are also rigidly mounted to the ADF structure. The disadvantage of this method is that it is difficult to balance the normal force between the two drive rollers. The stiff elastomer durometer acts as a spring constant and any minor difference in the roller diameter, roller run-out, or roller position relative to the bed will result in a significant difference in the normal force between the two rollers. A second prior art method is to spring load an axle to the ADF structure, turning the end of the axle with a motor and gear train or timing belt linkage. The motor is rigidly mounted to the ADF structure. The linkage moves with the axle and pivots about the motor shaft. The disadvantage is that it becomes substantially impossible to balance the normal force between the two drive rollers. The linkage generates unequal force when moving the drive roller axle in a forward direction versus a reverse direction. Because the linkage is positioned at the end of the axle, this unequal force teeters the drive roller axle and results in uneven normal forces. A third prior art method is to again spring load the axle to the ADF structure, again turning the end of the axle with a motor and gear train or timing belt linkage with the motor and linage moving with the axle. Disadvantages are a difficulty in balancing the normal force between the two drive rollers and the susceptibility of a motor suspension to transportation shocks (the motor weight far exceeds the required drive roller normal force and therefore requires a complicated suspension to lift the motor on one end while maintaining a balance force to the other end of the axle. A fourth prior art method is to spring load an axle to the ADF structure and turn the axle in the middle. Both the motor and linkage move with the axle. The disadvantages of this method are that the motor weight far exceeds the required drive roller normal force and therefore requires a complicated suspension system in the middle of the ADF structure where it is geometrically constrained and that the motor suspension is susceptible to transportation shocks.

In order to have an ADF with a small workplace form factor (also sometimes referred to as a "desktop footprint"), it is desirable to input and output document sheets from vertically oriented trays. One vertically aligned paper sheet input mechanism is taught by Hock et al. in related U.S. Pat. Nos. 5,320,436 and 5,326,090, assigned to the common assignee of the present invention.

There is a need for an inexpensive ADF, having a simple paper path and being adaptable for hard copy apparatus that employ a flat bed document scanners.

SUMMARY OF THE INVENTION

In its basic aspects, the present invention provides a modular automatic document feeder "ADF" for use with a flat bed input device, such as a flat bed scanner or flat bed copier. The ADF has a set of three unitary chassis including a main chassis disposed between an upper chassis and a lower chassis for defining a complete paper path onto and off of the flat bed scanner when the ADF is releasably mounted thereto. The modular construction of the three separate chassis facilitates ease of assembly in a fast and efficient manner. Accordingly, it is an advantage of the present invention that provides an automatic document feeder having a simple, three chassis modular construction, creating a complete paper path.

It is an advantage of the present invention that it permits simple plastic injection molding manufacture of the chassis constructs.

It is an advantage of the present invention that the use of a minimal number of foundational ADF units minimizes the tolerance accumulations among features.

It is an advantage of the present invention that it has an attachment hinge mechanism providing precision alignment of the ADF to the scanner without the use of tools.

It is an advantage of the present invention that it provides a quick connect-disconnect of an ADF to a base unit.

It is another advantage of the present invention that it allows lifting of the ADF and direct access to the base unit copying surface to permit hand copying such as for brochures and books.

It is another advantage of the present invention that it has a low profile, small footprint, document output tray.

It is a further advantage of the present invention that the use of a minimal number of foundational ADF units minimizes the manufacturing assembly time and skill requirements.

It is a further advantage of the present invention that it achieves manufacturing cost reduction while providing a reliable ADF.

It is yet another advantage of the present invention that it eliminates the need for a pre-picking mechanism to ensure paper gets to a pick roller.

It is still another advantage of the present invention that it provides a paper drive mechanism having balanced drive roller normal forces to ensure loading and unloading paper sheets without skew.

Other objects, features and advantages of the present invention will become apparent upon consideration of the following explanation and the accompanying drawings, in which like reference designations represent like features throughout the drawings.

BRIEF DESCRIPTION OF THE DRAWINGS

The above mentioned features of the preferred embodiments of the present invention and the manner of attaining them will become apparent, and the invention itself will be best understood by reference to the following description of the embodiments of the invention in conjunction with the accompanying drawings, wherein:

FIG. 7 is a rear perspective view of the upper chassis as shown in FIG. 6;

FIG. 8D is a front perspective view of an alternative embodiment of the lower chassis of FIG. 8A having a paper depressor element;

FIG. 8M is a rear perspective view of the lower chassis of FIG. 8A;

FIGS. 9A–9G are schematic drawings showing a document sheet loading and unloading sequence.

FIG. 17 is a schematic elevation side view of the document sheet backing mechanism of FIG. 16 in the document sheet loading operational condition;

FIG. 18 is a schematic elevation side view of the document sheet backing mechanism of FIG. 16 in the document scanning operational condition;

FIG. 19 is a schematic elevation side view of the document sheet backing mechanism of FIG. 16 in the document sheet unloading operational condition;

Figure 1:
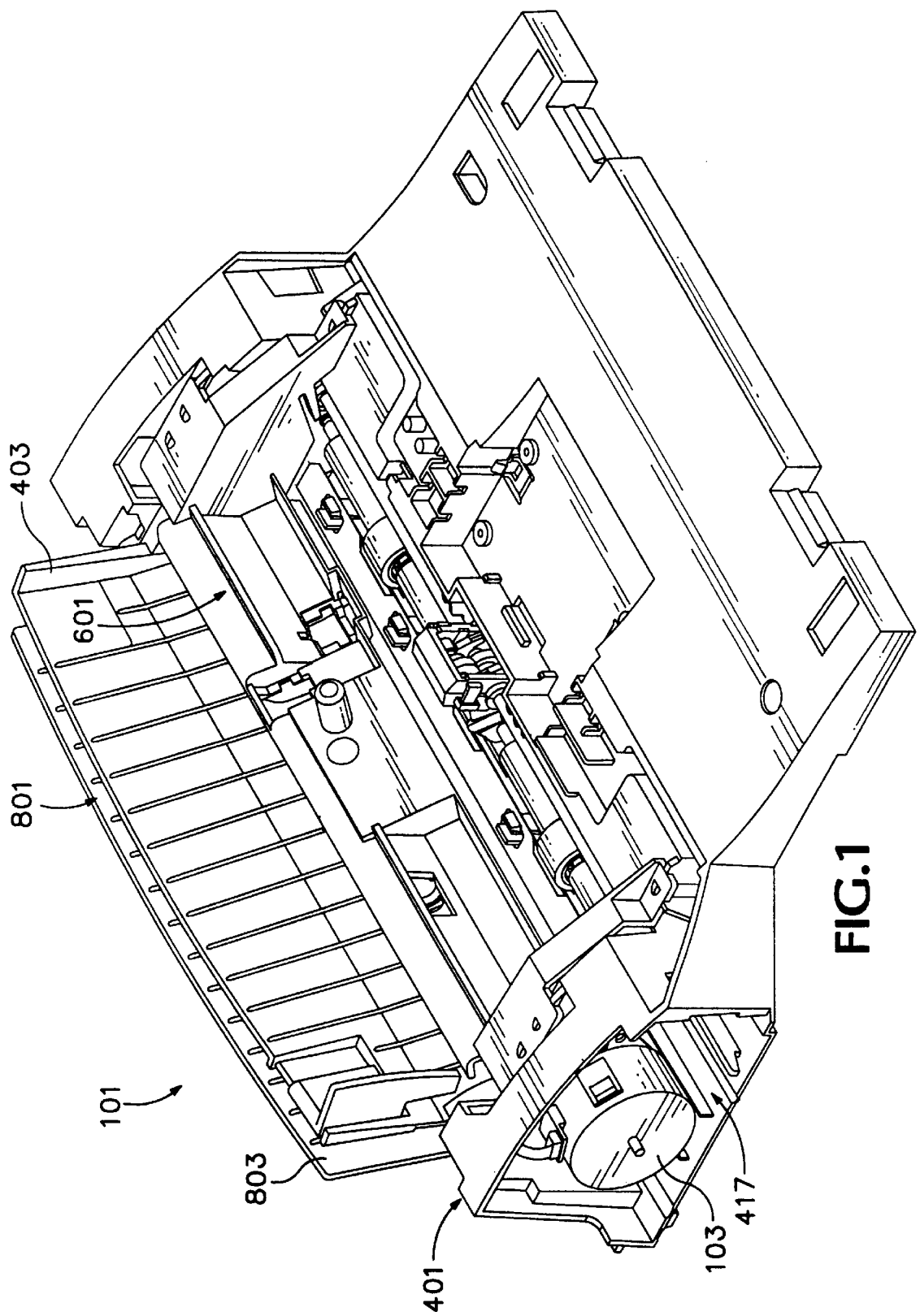
FIG. 1 is a perspective view of an ADF, which is constructed in accordance with the present invention.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable. Subtitles are provided herein for reference only; no limitation on the scope of the invention is intended nor should any be implied therefrom. Paper pick and feed drive software and firmware algorithms are well known in the art and beyond the scope of the present invention; therefore, knowledge of a person skilled in the art is presumed and no detailed description of such is provided herein nor is such necessary for an understanding of the present invention.

For ease in understanding the preferred embodiment of the present invention the following outline is provided:

A. Overall Modular Construction
B. Main Chassis
C. Upper Chassis
D. Lower Chassis
E. Attachment Hinge
F. Input Tray Paper Stop and Pick
G. Paper Drive/Document Backing
H. Paper Path
I. Lift Cam Mechanism A. Overall Modular Construction Referring now to the drawings and more particularly to FIGS. 1–3, 10 and 11, there is shown an automatic document feeder 101 which is constructed in accordance with the preferred embodiment of the present invention and which is adapted for use with a flat bed scanner 1101. The automatic document feeder 101, will be referred to hereinafter as "the ADF" for simplicity purposes.

Although in the preferred embodiment of the present invention reference is made to a flat bed scanner 1101, those skilled in the art will understand any type of flat bed input device can be utilized, such as a flat bed copier.

Figure 8A:
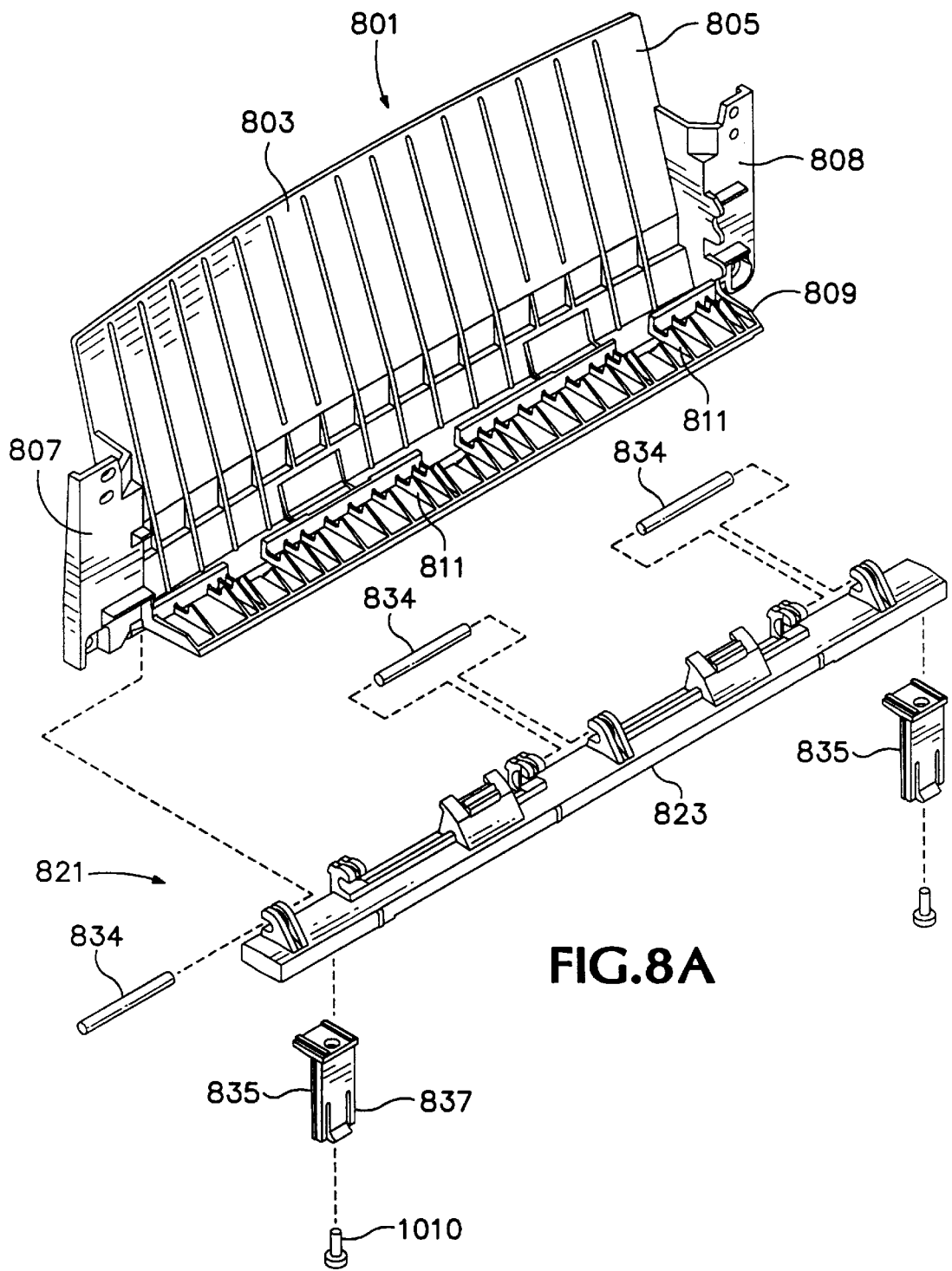
FIG. 8A is an exploded, front perspective view of a lower chassis of the ADF as shown in FIG. 1, including an ADF attachment hinge in accordance with the present invention.
Figure 8B:
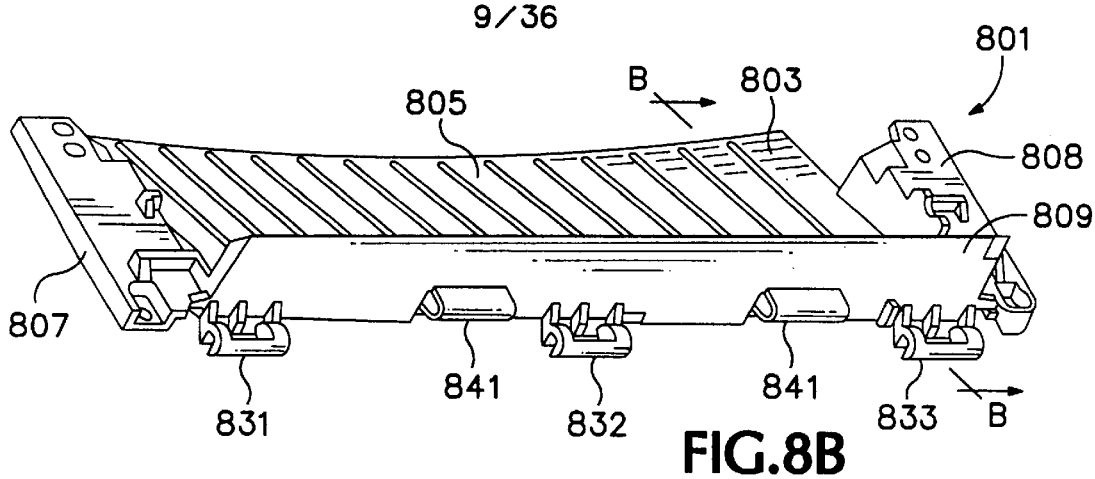
FIG. 8B is front perspective view of the lower chassis of FIG. 8A.
Figure 8C:
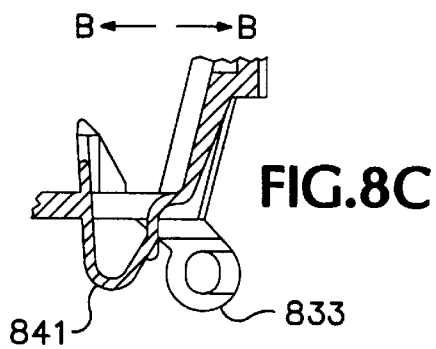
FIG. 8C is a fragmentary cross-sectional view of the lower chassis of FIG. 8A, taken along line B—B.
Figure 10A:
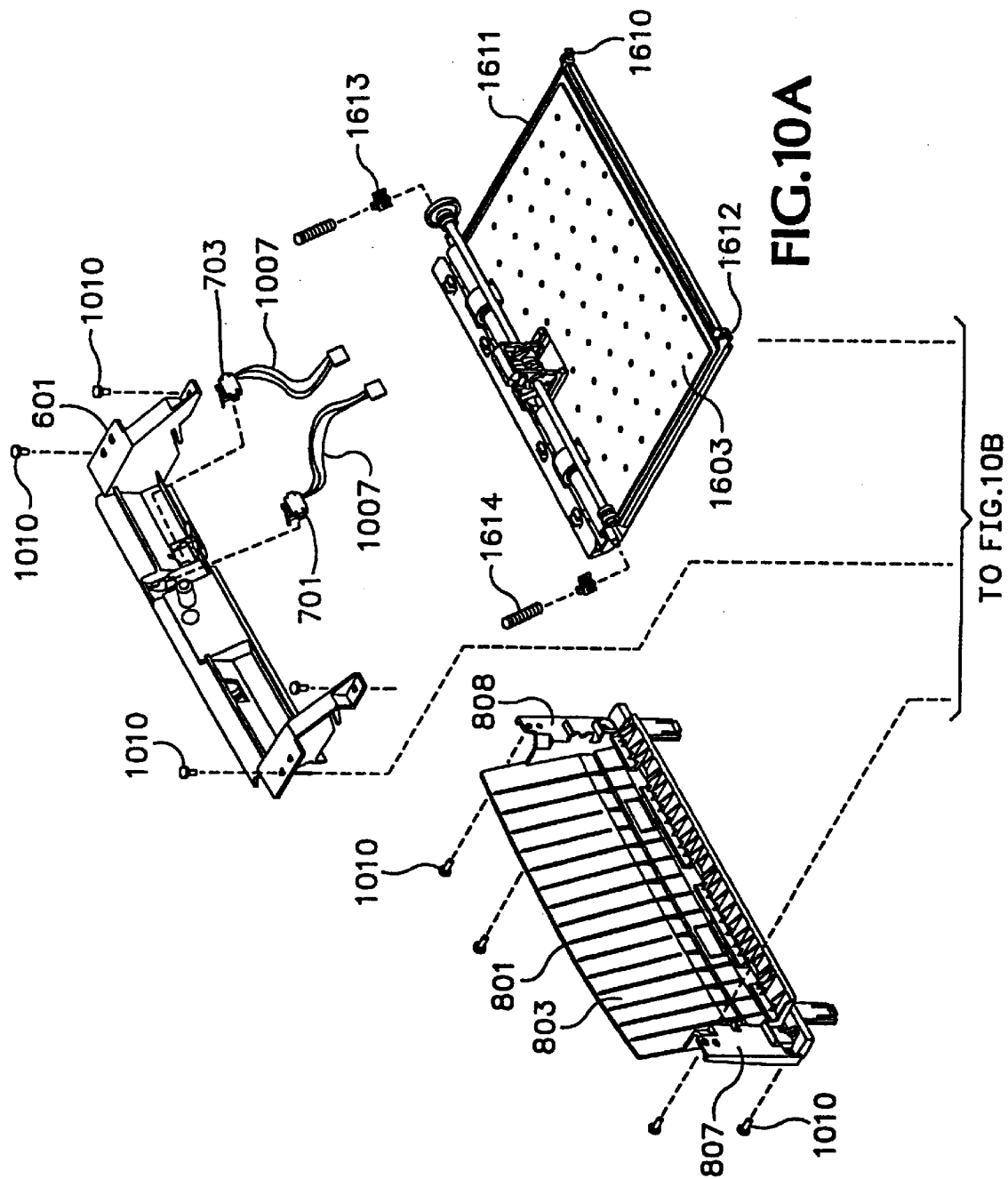
FIGS. 10A–10B are exploded, perspective drawings of the ADF as shown in FIG. 1 with a top case.

The ADF 101 is modular in nature and generally comprises a set of assemblies or chassis including a main chassis 401 (FIGS. 4–5), an upper chassis 601 (FIGS. 6–7), and a lower chassis 801 (FIGS. 8A–8D). The three chassis 401, 601, and 801 when assembled together form a medium path (P) that extends from a medium input tray 403 best seen in FIG. 11, to a medium output tray 803 as illustrated in FIG. 8C. In understanding the preferred embodiment of the present invention, it will be helpful throughout the description that follows, to refer generally to FIGS. 10 and 11. FIG. 10 shows an exploded view of the ADF 101 accompanied by an exemplary top case or outer shell 1001, while FIG. 11 illustrates the assembled ADF 101 with the top case 1001 in place relative to a generic scanner bezel 1101.

The three chassis 401, 601, and 801 are each unitary, injection molded plastic parts adapted for simple assembly. Commercial embodiment drawings are provided herein; therefore, it will be recognized by those skilled in the art that many features shown in the drawings are related to the molding process rather than to operational features. Injection molding process features are known to be design expedient and implementation specific; therefore, no further explanation is required in order to understand the invention as claimed.

Figure 10B:
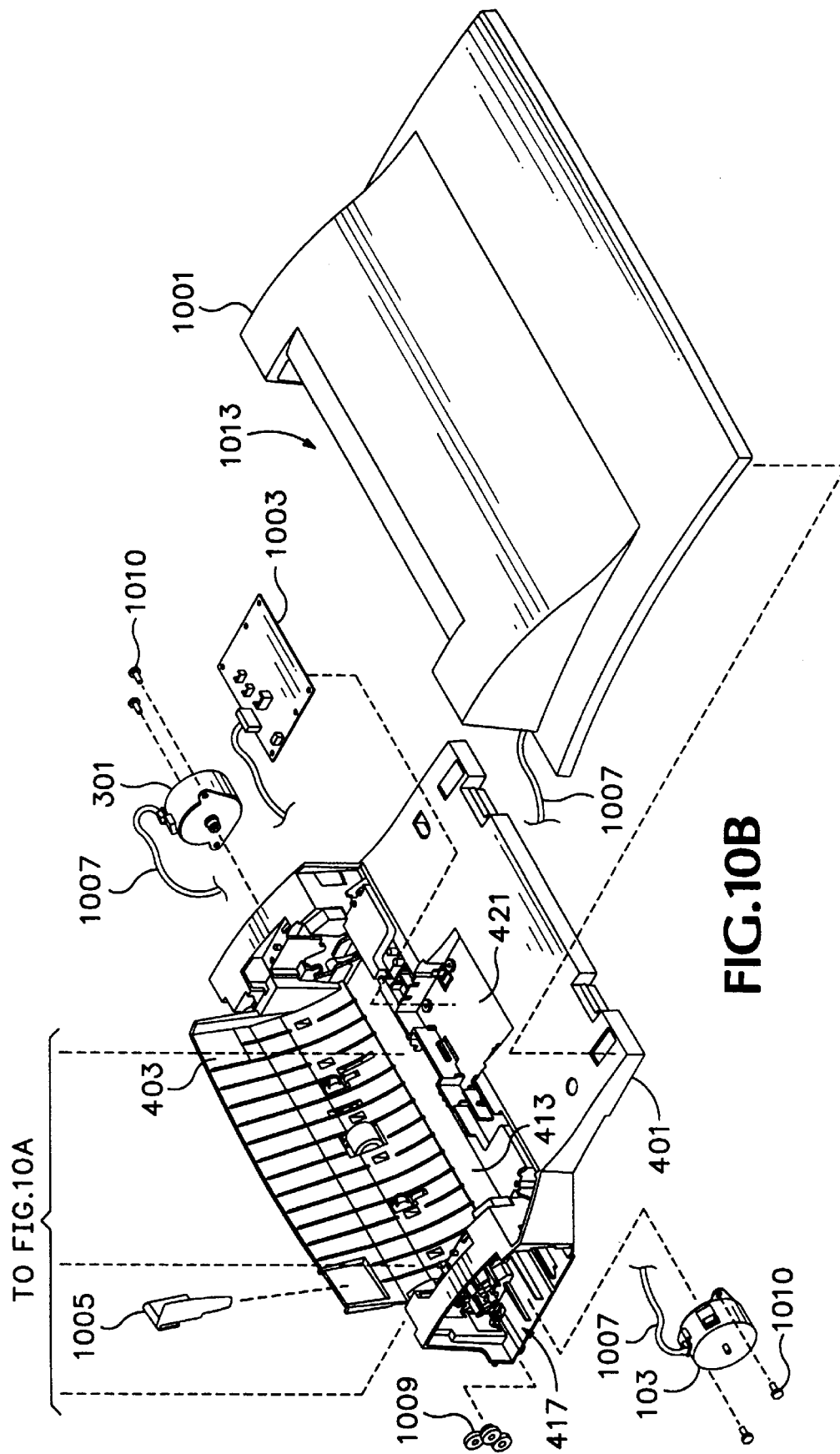
Figure 11:
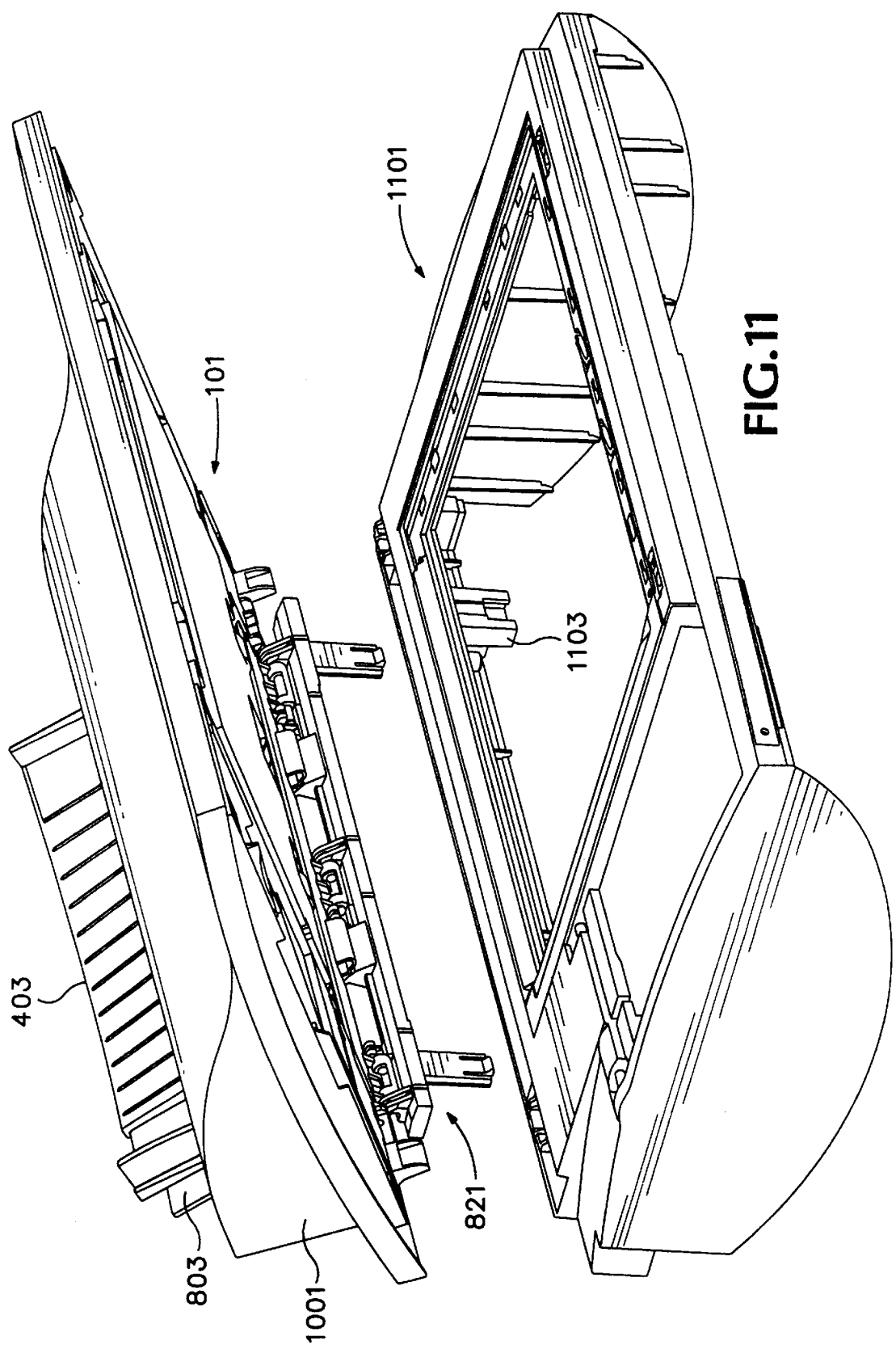
FIG. 11 is a perspective drawing depicting the orientation of the ADF relative to a flat bed input device bezel.

As can be recognized from FIG. 10B, when the ADF 101 is assembled with the top case 1001 in place, the construct presents to the end-user a simple input document slot 1013, backed by an input tray 403, where the stacked document sheets are loaded laterally, print side down, i.e., rearwardly facing. Note that the document is loaded in a "landscape" orientation regardless of the print orientation on the individual sheets. The only other feature of the assembled ADF construct apparent to the end-user is an output tray 803, protruding upwardly behind the input tray 403, where collated output document pages are received from the internal paper transport mechanism following scanning or copying, for example. Output sheets are received within a gap between the input tray 403 backside and the output tray 803 front side, best seen in FIGS. 2 and 3. Any control panel features which may be provided in a specific implementation, e.g., START and STOP pushbuttons, can also be provided in an accessible location on the top case 1001. This modular construction establishes the complete input-to-output paper path.

B. Main Chassis

Figure 4:
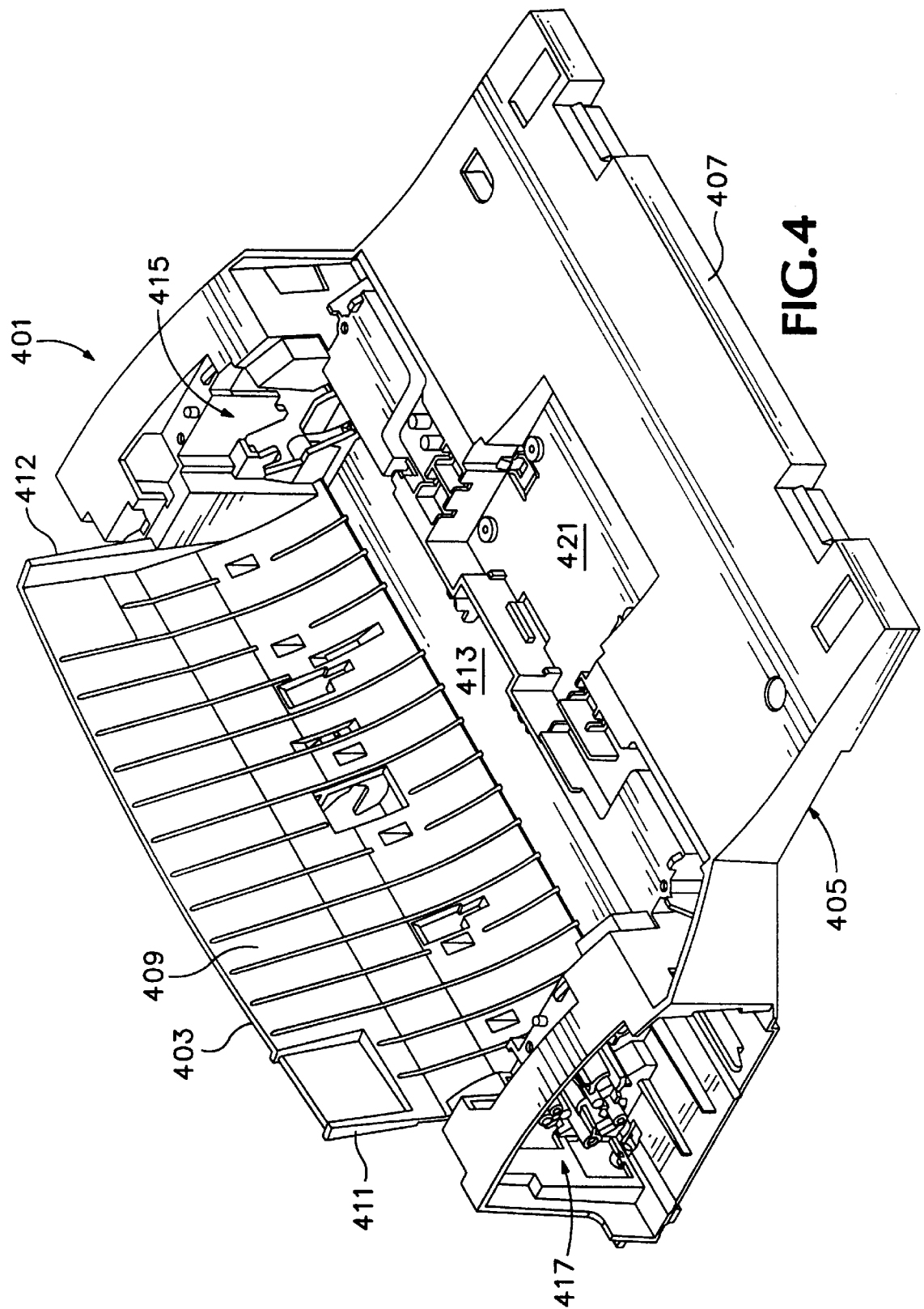
FIG. 4 is a front perspective view of a main chassis of the ADF as shown in FIG. 1.
Figure 5:
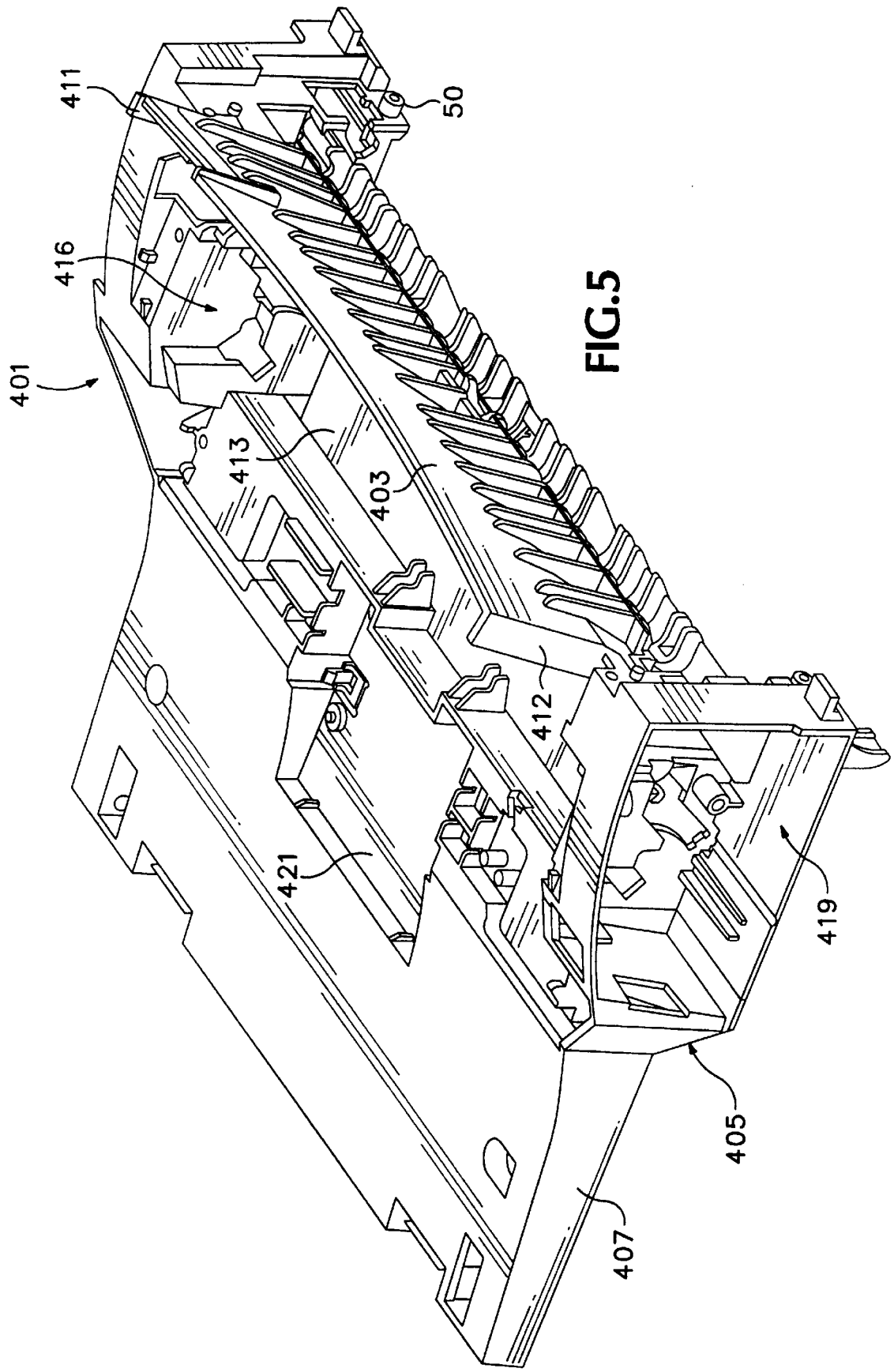
FIG. 5 is a rear perspective view of the main chassis as shown in FIG. 4.
Figure 6A:
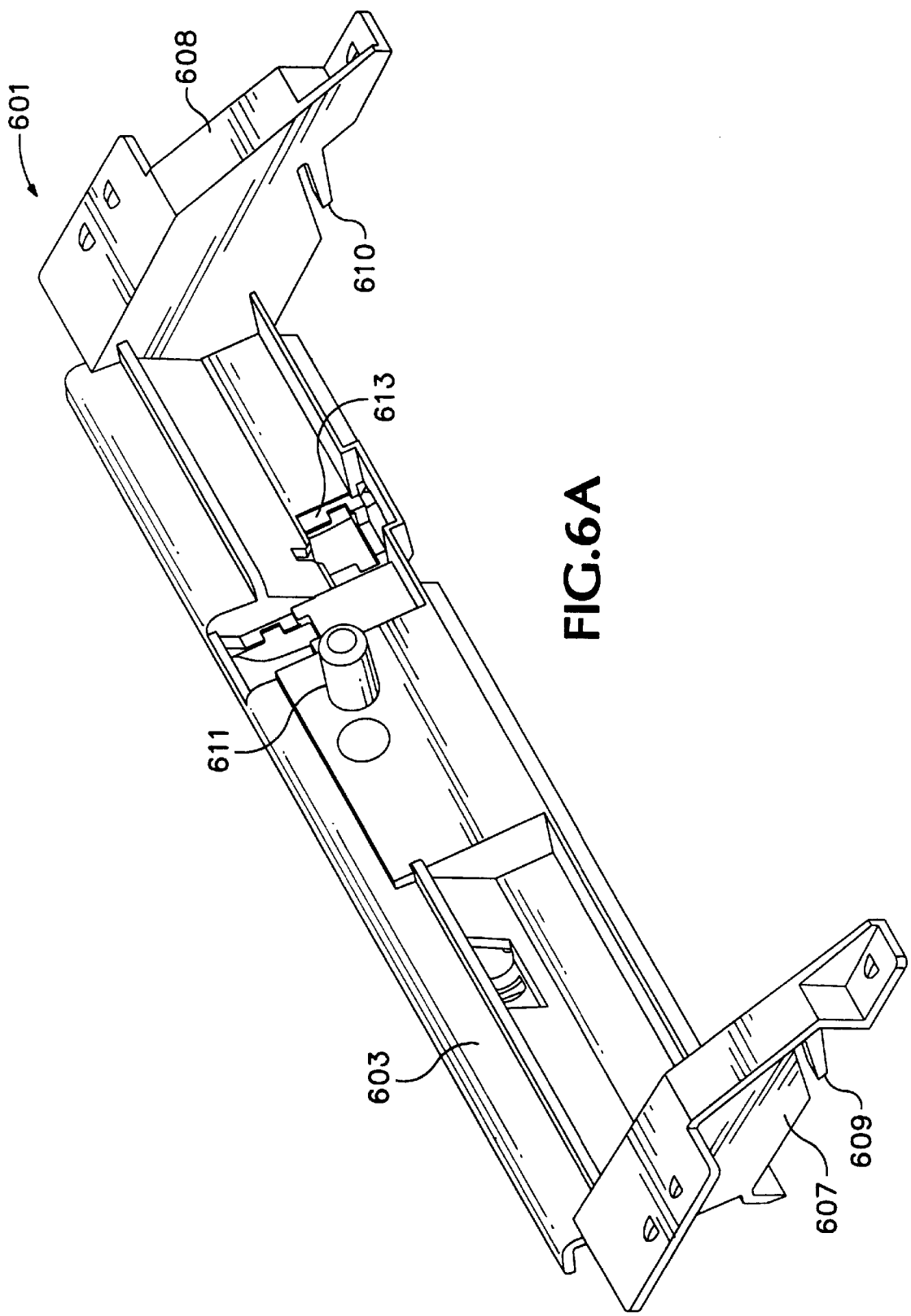
FIG. 6A is a front perspective view of an upper chassis of the ADF as shown in FIG. 1.

Considering now the main chassis 401 in greater detail with reference to FIGS. 4–5, the main chassis 401 to the extent possible for a specific implementation, is a unitary injection molded plastic part. The main chassis 401 is provided with all the features to house the operationally functional features of the ADF 101, namely motors, gear trains, shafts, paper picks and rollers, document lift assembly, and electronic controller equipment, and to establish an input paper path. Some functional features of the main chassis 401 are related to the interfit of the three chassis and paper drive mechanism and, therefore, further explanation of these features is relevant.

As best seen in FIGS. 4–5, the main chassis 401 includes an integrally formed main chassis shell 405 having a substantially planar base 407. An input tray 403 rises upwardly and rearwardly from the base 407. The input tray 403 has a document receiving surface 409 that has a concave shape, in both vertical and horizontal planes. This double-concave shape assists in both properly aligning the sheets of a multi-sheet input document (not shown) and stiffening the document to facilitate sheet feeding without jamming. See also, U.S. Pat. Appl. Ser. No. 08/706,032, filed by Hong on Aug. 30, 1996, for an *Image-Related Device Having Image-Medium Receiving Tray, and a Tray for Same, and a Method for Designing Such Tray*, assigned to the common assignee of the present invention. More particularly, by permitting the document to conform to the concave surface shape of the input tray 403 and having the sheet aligned in the input tray 403 along its longitudinal edge rather than in the more conventional top or bottom edge first, causes each sheet to stiffen and thus facilitates a clean individual sheet pick. See also, U.S. Pat. No. 5,320,436, supra, col. 15, starting at line 65. A left input tray stanchion 411 and a right input tray stanchion 412, each protruding forwardly from the document receiving surface 409, further assist in aligning the sheets of the input document. As shown only in FIGS. 10A–10B, a sliding paper length adjuster, or simply "slider," 1005 can be mounted to the input tray 403.

As will be explained hereinafter in greater detail, the main chassis shell 405 includes three cavity areas 413, 417, and 419 respectively that are functionally related. The cavity area 413, is a central cavity that is disposed between the cavity areas 417 and 419, which are hereinafter called a left side main chassis cavity 417, and a right side main chassis cavity 419.

In order to facilitate the specific implementation design expedients, the construct of the shell 405 includes a group of upper right side interfit features 415 and a group of left side interfit features 416. The right group of interfit features 415 is disposed on the right side of the main chassis central cavity area 413, while the left group of interfit features 416 is disposed on the left side of the main chassis central cavity area 413. The configuration of the groups of interfit features 415 and 416 facilitates the construct of the main chassis 401 in a fast and efficient manner. In this regard, as best seen in FIGS. 10A–10B, the upper chassis 601 mates between the interfit features 415 and 416 permitting the upper chassis 601 to easily drop into the central cavity area 413 of the main chassis 401. Moreover, the rear side of the main chassis 401 is also configured to matingly engage the lower chassis 801. Thus, the lower chassis 801 is easily mounted on the rear side of the main chassis 401 by a set of four screws such as screw 1010. In this regard, as best seen in FIG. 5, a set of molded screw retainer bushings, such as a bushing 50, are provided to align where the lower chassis 801 is screw mounted to the main chassis 401.

When the upper chassis 601 is set in place relative to the main chassis 401, a sheet feed gap is created between the input tray surface 409 and a rear portion of the upper chassis 601 at about the central cavity area 413. Document sheets loaded into the input tray 403 drop sequentially in seriatim through this gap to travel onto the supporting surface of the flat bed input device 1101 as will be explained hereinafter in greater detail. Similarly, when the lower chassis 801 is mounted in place relative to the main chassis 401, a sheet receiving gap is created between the lower chassis 801 and the lower rear of the main chassis 401.

Considering now the left side main chassis cavity 417 in greater detail with reference to FIG.4, the cavity area 417 is sufficiently large in volume to receive therein a left side stepper motor 103. The stepper motor 103 is mounted within the cavity area 413 by and suitable mounting devices, such as the mounting devices 1010. The cavity area 417 is open outwardly from the central cavity area 413 in order to facilitate ease of assembling the step motor 103 within the cavity 417.

Considering now the right side main chassis cavity 419 in greater detail with reference to FIG. 5, the right side cavity area 419 also has a sufficiently large volume to receive therein a right side stepper motor 301, that is substantially similar in construction to the left side stepper motor 103. The right side stepper motor 301, like the left side stepper motor 103 is mounted within the cavity area 419 by conventional mounting devices 1010.

Figure 12:
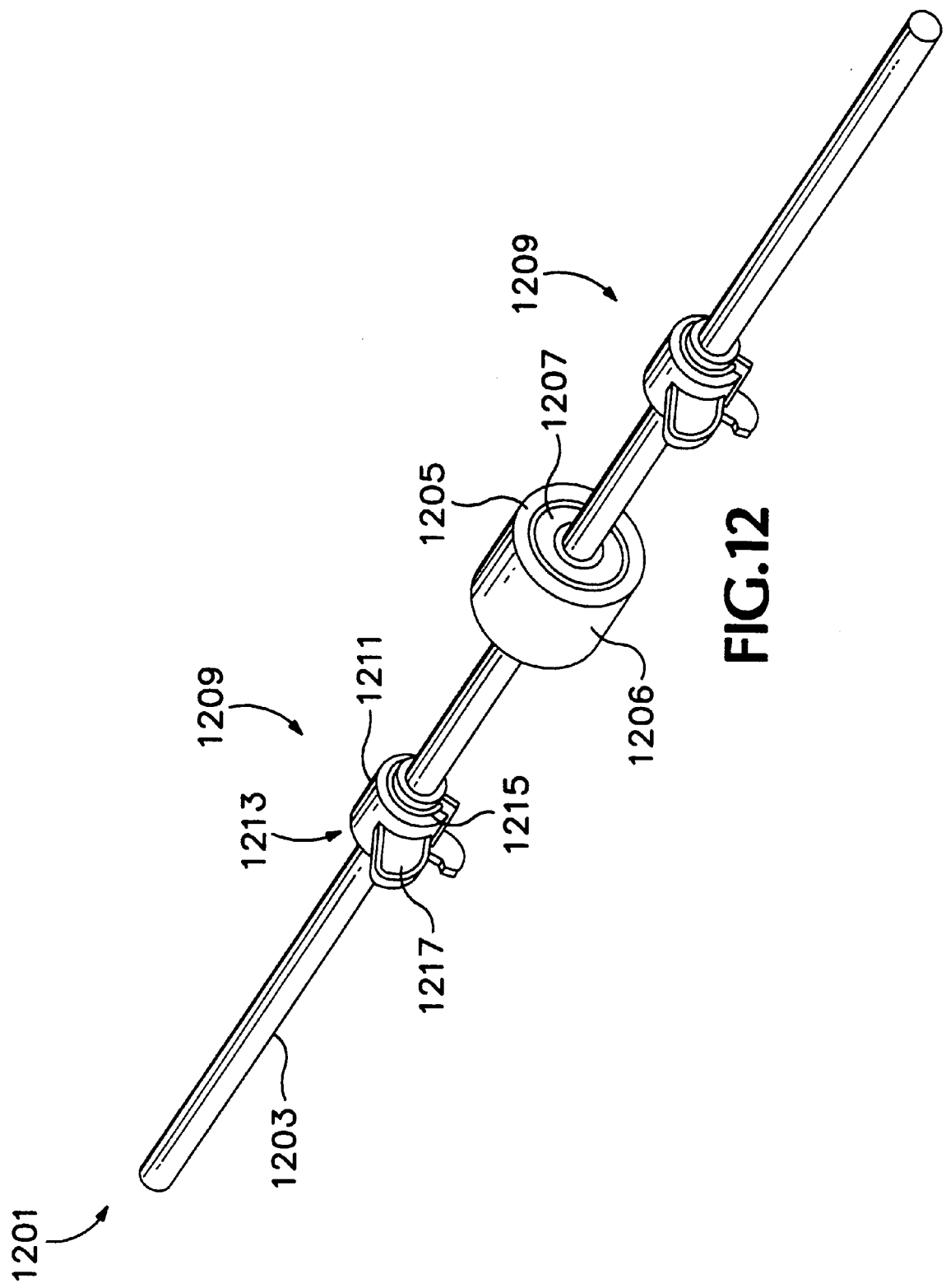
FIG. 12 is a perspective detail drawing depicting an input tray paper stop and pick mechanism extracted from the present invention as shown in FIG. 4.

As will be explained hereinafter with reference to FIGS. 10A–10B and FIG. 12, other mechanical elements of the ADF 101, such as a gear train or transmission arrangement 1009, a paper pick 1201 and a paper drive shaft 1203, are coupled to the respective stepper motors 103 and 301 in a conventional manner which is well known to those skilled in the art. It is sufficient to note however, that the stepper motors 103 and 301 are sequenced in operation by a controller 1003. The controller 1003, as best seen in FIG. 10B is configured in the form of a printed circuit board having electrical cabling indicated generally at 1007 that interconnects electrically the controller 1003 with the motors 103 and 301 as well as other electrical components in the ADF 101. The printed circuit board is dimensioned to be received within a front cavity area 421 of the main chassis 401.

C. Upper Chassis

Considering now the upper chassis 601 in greater detail with reference to FIGS. 6A–6B and 7A–7C, a main cross beam 603 is positioned to traverse the main chassis first cavity 413 parallel to the input tray 403 (FIGS. 1–3 and 10). A left side cantilever 607 and a right side cantilever 608 extend forwardly from each end of the cross beam 603. Each cantilever 607, 608 is provided with interfit features along the lower and side edges thereof, or as otherwise necessary for a particular implementation, which mate with the main chassis interfit features 416, 415, respectively. Again, it is important to note that the upper chassis 601 is a unitary injection molded plastic piece part; molding features and interfit features will be specific to a particular design implementation. The upper chassis 601 is also secured to the main chassis 401 with conventional fasteners 1010 as shown in FIGS. 10–10B.

Figure 3:
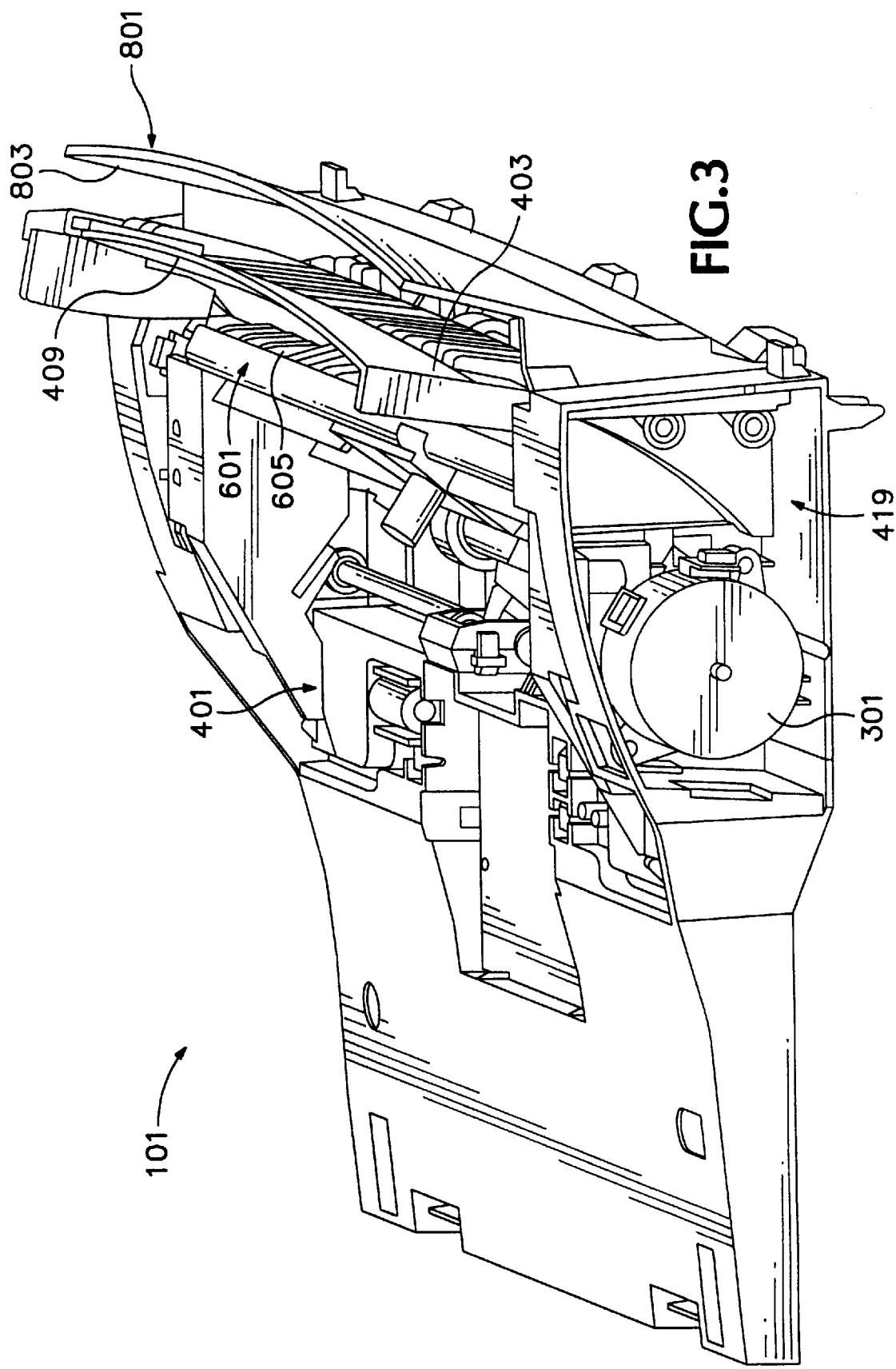
FIG. 3 is a rear, right, overhead perspective view of the ADF as shown in FIG. 1.

As shown in FIG. 6B, the rear of the cross beam 603 is provided with a plurality of protruding fins 605. When the upper chassis 601 is mounted into the main chassis 401, the fins 605 are in close proximity to the input tray surface 409 as seen in FIG. 3. When a document is loaded into the input tray 403, the document sheets are held between the input tray surface 409 and the upper chassis fins 605.

Molded leaf spring features 609, 610 are provided to retain a transfer shaft 627 using bushings 625, 626 as shown in FIGS. 7A–7C. A separator shaft 628 is mounted to the upper chassis 601 using molded capture bearings 618, 619, 620, 621 and a bushing 615 and another molded leaf spring 622 provided to retain a bushing 623. The separator shaft 628 bears a fixedly mounted central paper separator wheel 631 (FIGS. 7B and 7C). One end of the separator shaft 628 is coupled to a motor (not shown in this FIG.) via gearing 633 and is driven during a paper feed cycle.

A spring retainer 611 holds a compression spring (FIG. 7B and 7C). As shown in FIG. 7C, a tray sensor 701 and a pick sensor 703 as would be known in the art.

D. Lower Chassis—Output Tray

The lower chassis 801 is shown in further detail in FIGS. 8A–8L, along with a quick release attachment hinge 821. The entire lower chassis 801 is a unitary injection molded plastic part. Like the input tray 403, and as best seen in FIG. 8C, a document output tray 803 has a surface 805 that provides a shallow concave curvature in a short height form factor—in the dimensional region of half the paper width, e.g., approximately one-half that of an A-size to legal size paper sheet equal to about 4.25 inches. Again this takes advantage of paper stiffness induced when it is shaped into a semi-cylindrical form along its longitudinal axis. Thus, this embodiment can have a lower height form factor that no longer needs to support a remaining half of a document sheet by requiring such well known prior art mechanisms as output tray pull-out extensions, wire frame clips, or the like. Returning to FIGS. 8A and 8B, an upper chassis left stanchion 807 and an upper chassis right stanchion 808 are integrally molded parts of the lower chassis 801, protruding forwardly from the output tray surface 805. As shown in FIG. 10A, the two stanchions 807, 808 are used for mounting the lower chassis 801 via appropriately molded interfit features to the main chassis 401 with fasteners 1010 any suitable known or proprietary type.

Along the lower edge of the output tray 803, a document sheet output guide and shelf 809 extends forwardly. Output tray paper guide fins 811 protrude upwardly from the shelf 809 to lift the leading lateral edge of a sheet of output paper, directing it to follow along the output tray surface 805.

Figure 2:
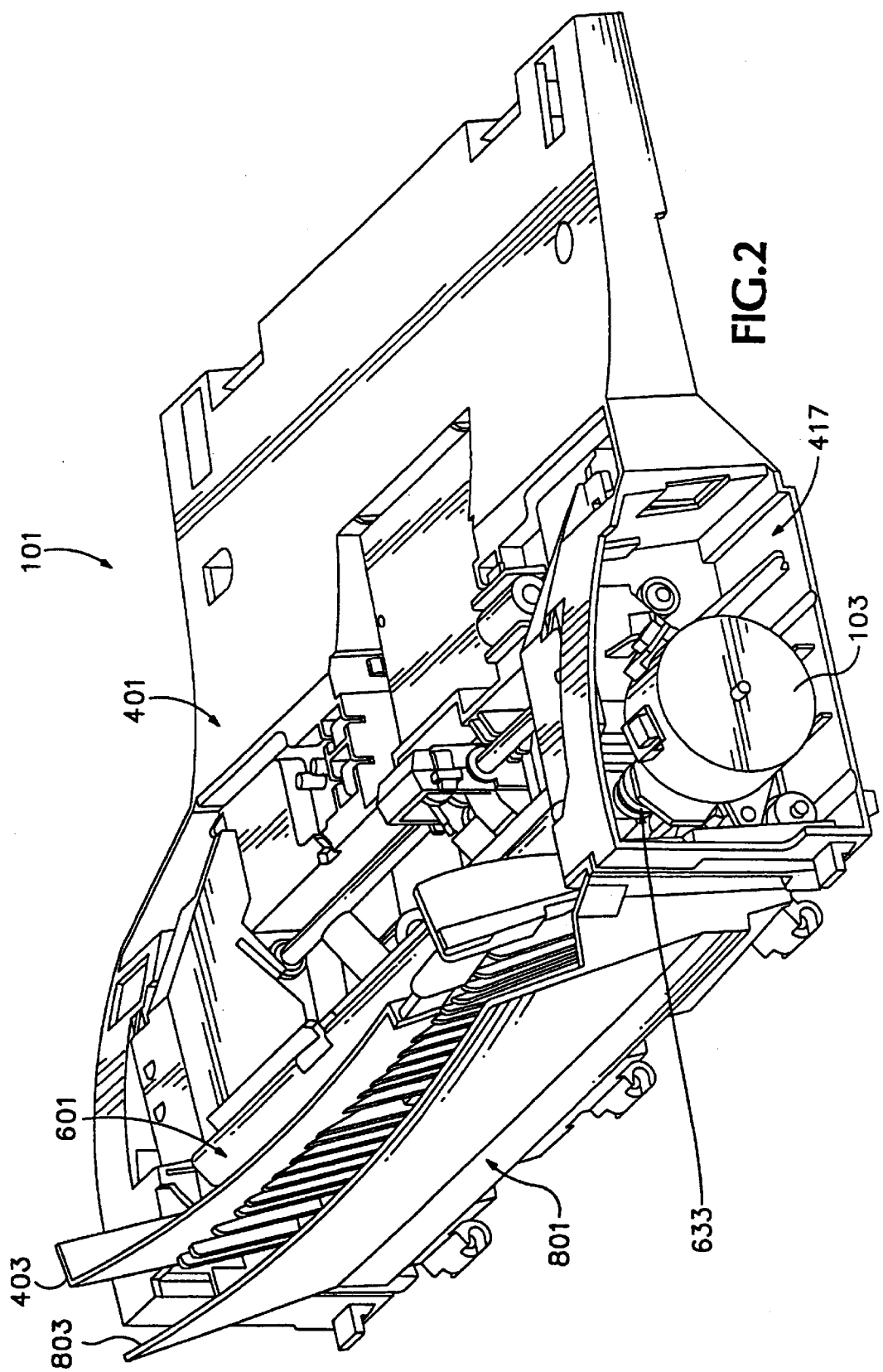
FIG. 2 is a rear, left, overhead perspective view of the ADF as shown in FIG. 1.

As best seen in FIGS. 2 and 3, the output tray 803, like the input tray 403, has a substantially vertical orientation. The gap between the two trays 403, 803 provides access for retrieval of the collated output document sheets.

Figure 15:
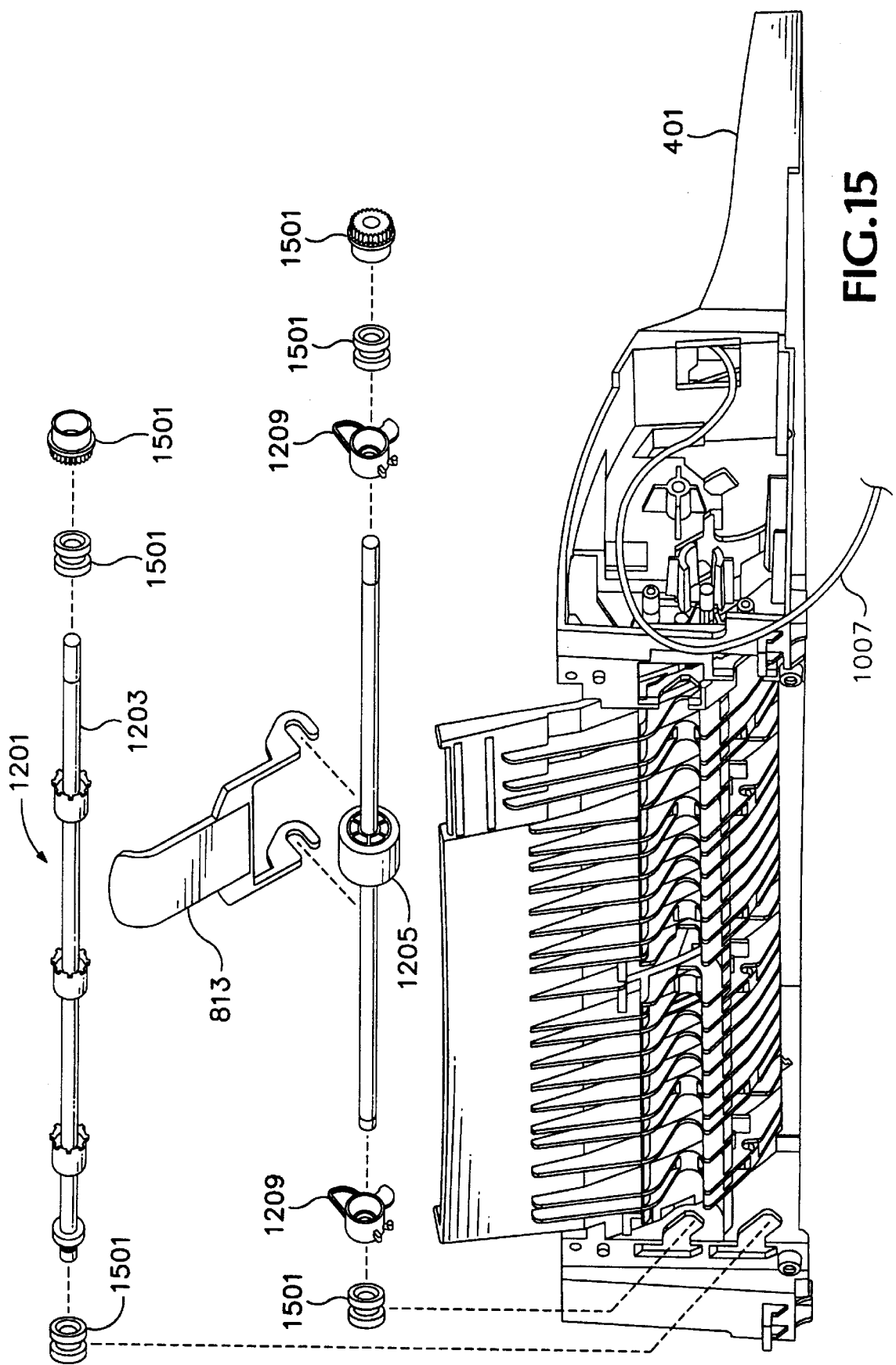
FIG. 15 is a rear, left, perspective drawing of the main chassis as shown in FIGS. 4 and 5 showing the mounting of the paper stop and pick mechanism of FIGS. 12–14;.

In an alternative embodiment as depicted in FIG. 8D, a paper depressor 813 is added to the central region of the surface 805 of the output tray 803. To mount the paper depressor, lower extremities 815 are formed to snap-fit to the paper pick and stop shaft 1203 (as shown in FIG. 15). The paper depressor 813 is made of a low friction material such as commercially available Cycoloy™, made by the General Electric company of One Plastics Avenue, Pittsfield, Mass. 01201. This design has been proven to work reliably for plain papers from 16-pound to 24-pound types at any acute angle less than forty-fives degrees to vertical as long as the output tray height is at least one-half the document sheet length. With the paper depressor 813, the paper sheets are forced into a cylindrical shape and stiffened. Without the depressor 813, the output tray angle to vertical should be reclining sufficiently to retain the paper sheets upright.

E. Attachment Hinge

Considering now the quick release attachment hinge 821 in greater detail with reference to FIG. 8A, the hinge 821 enables the modular chassis 401, 601, and 801 when assembled to be mounted to the flat bed scanner 1101 with a precisely aligned document feed path relative to the supporting surface of the scanner 1101. The hinge 821 facilitates at least two different ADF/scanner orientations for document scanning purposes coupled with a quick release feature for disconnecting the ADF 101 from the scanner 1101. In this regard, as shown in FIG. 8A, the lower chassis 801 serves as a mount for the ADF hinge 821. As shown in FIG. 11, this attachment hinge 821 provides a dual purpose mechanism, both for mounting the assembled three chassis ADF 101 to either a compatible copier or scanner or to a bezel 1101 adapted to overlay such a copier or scanner flat bed scanning surface and for raising and lowering the ADF off a flat bed bezel without removal of the entire ADF system.

Returning to FIGS. 8A and 8E–8H, a crossbeam 823 is provided with a set of hinge axle retainers 825, 826, 827, 828, 829, 830. Axle retainers 825, 828, and 830 are rearwardly facing and axle retainers 826, 827, and 829 are forwardly facing. As seen in FIGS. 8B and 8C, the lower chassis 801 is provided with three axle casings 831, 832, and 833. Turning to FIG. 8A, three lower chassis attachment hinge axles 834 are provided to swivel mount the attachment hinge 821 to the lower chassis 801 in the shown manner via the axle retainers 825–830 and axle casings 831–833 with each of the axle casings riding an axle between a complementary pair of reversed-facing axle retainers, e.g., the casing element 831 is between retainer elements 825 and 826; see also FIGS. 8I–8L.

As shown in FIGS. 8A and 8F–8H, a pair of attachment hinge flanges 835 are mounted to the attachment hinge 821 by suitable fasteners 1010 and depend from the crossbeam 823. As shown in FIG. 11, in combination with the crossbeam 823, the flanges 835 are used to mount the assembled ADF to either a compatible copier or scanner or to a bezel 1101 adapted to overlay such a copier or scanner flat bed scanning surface. The flanges 835 are provided with dimensions sufficient not only to provide a steady, accurate aligning of the ADF, but also with a length sufficient to allow for lifting of the ADF vertically without removing the entire ADF from the bezel 1101 or flat bed, such as when the document pages to be scanned are in a book or magazine. To facilitate this function, the lower extremity of the hook 835 us provided with a flexible hook 837 adapted to catch a complementary lip or edge of the bezel or scanner flange receiving slots (see e.g., FIG. 11, sleeve 1103).

Figure 8E:
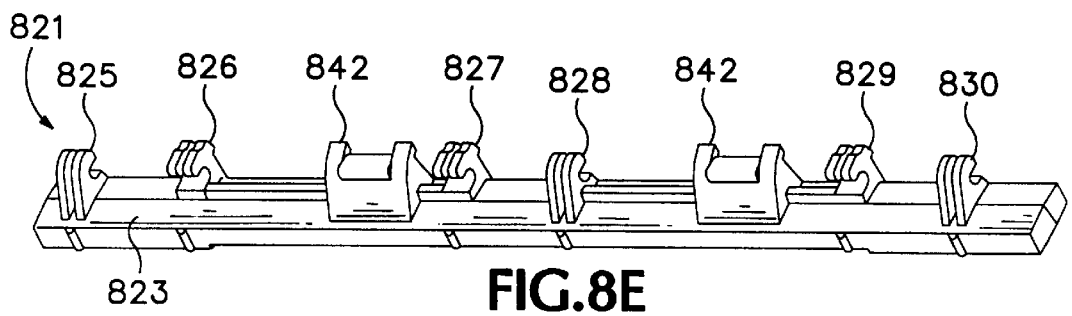
FIG. 8E is a perspective view of a crossbeam of the attachment hinge as shown in FIG. 8A.
Figure 8F:
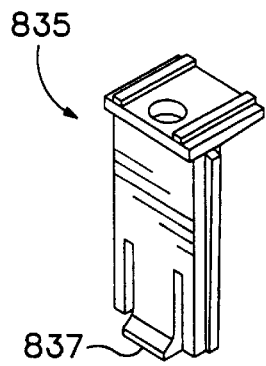
FIGS. 8F, 8G, and 8H are detail perspective views of retainer hooks for the attachment hinge as shown in FIG. 8A.
Figure 8G:
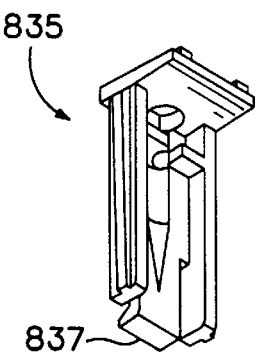
Figure 8H:
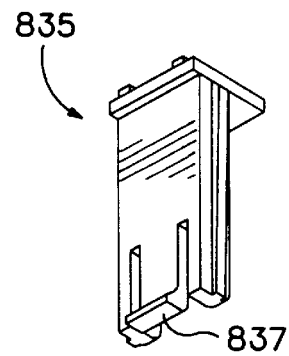
Figure 8I:
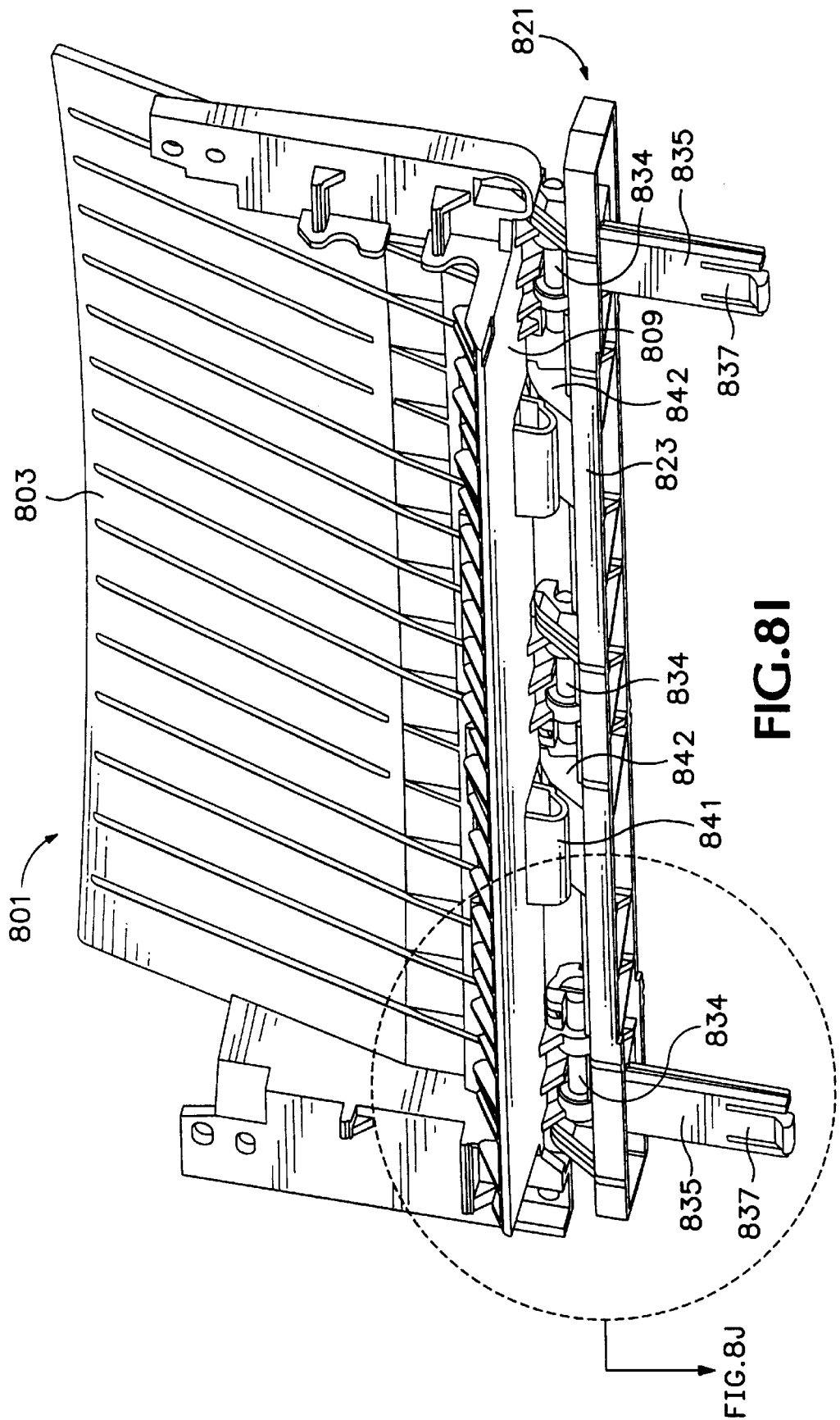
FIG. 8I is a front, right, low perspective view of the lower chassis of FIGS. 8A–8C with the attachment hinge as shown in FIGS. 8A, 8B, 8E, 8F, 8G, 8H mounted thereon.
Figure 8J:
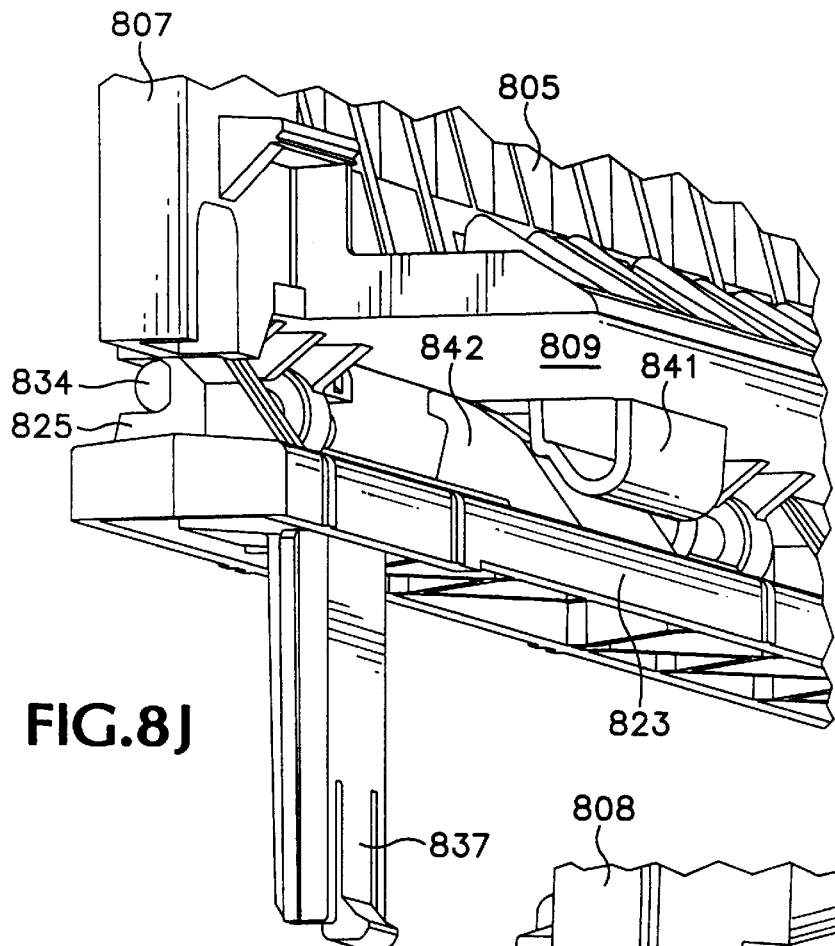
FIG. 8J is a reverse perspective of detail of FIG. 8I.
Figure 8L:
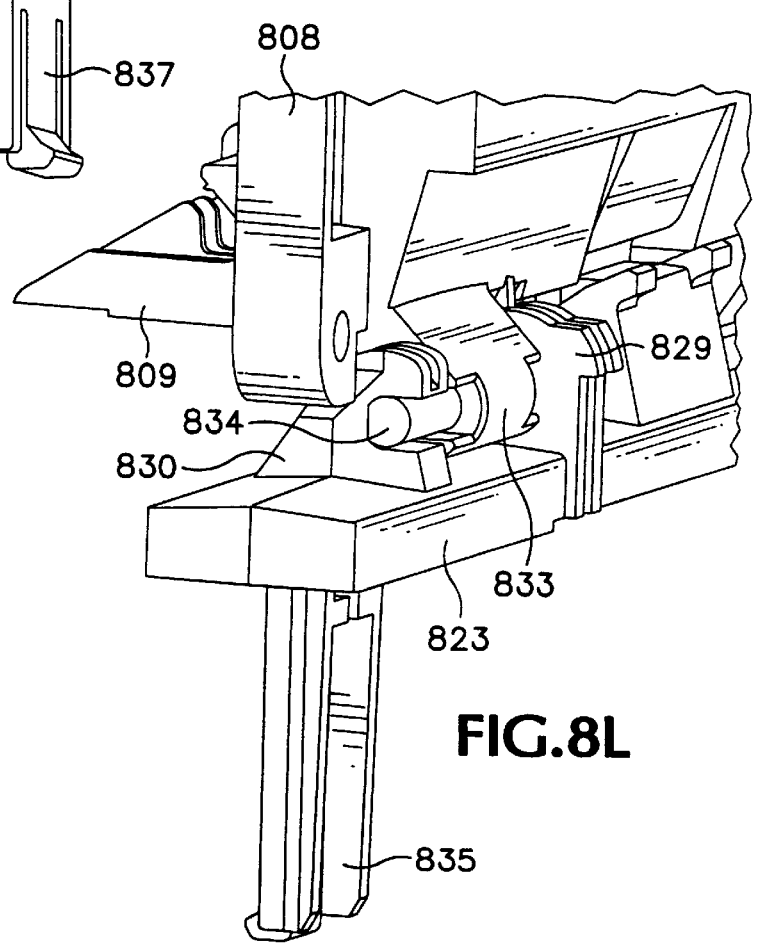
FIG. 8L is an enlarged fragmentary perspective view of the hinge attachment of FIG. 8K.
Figure 8K:
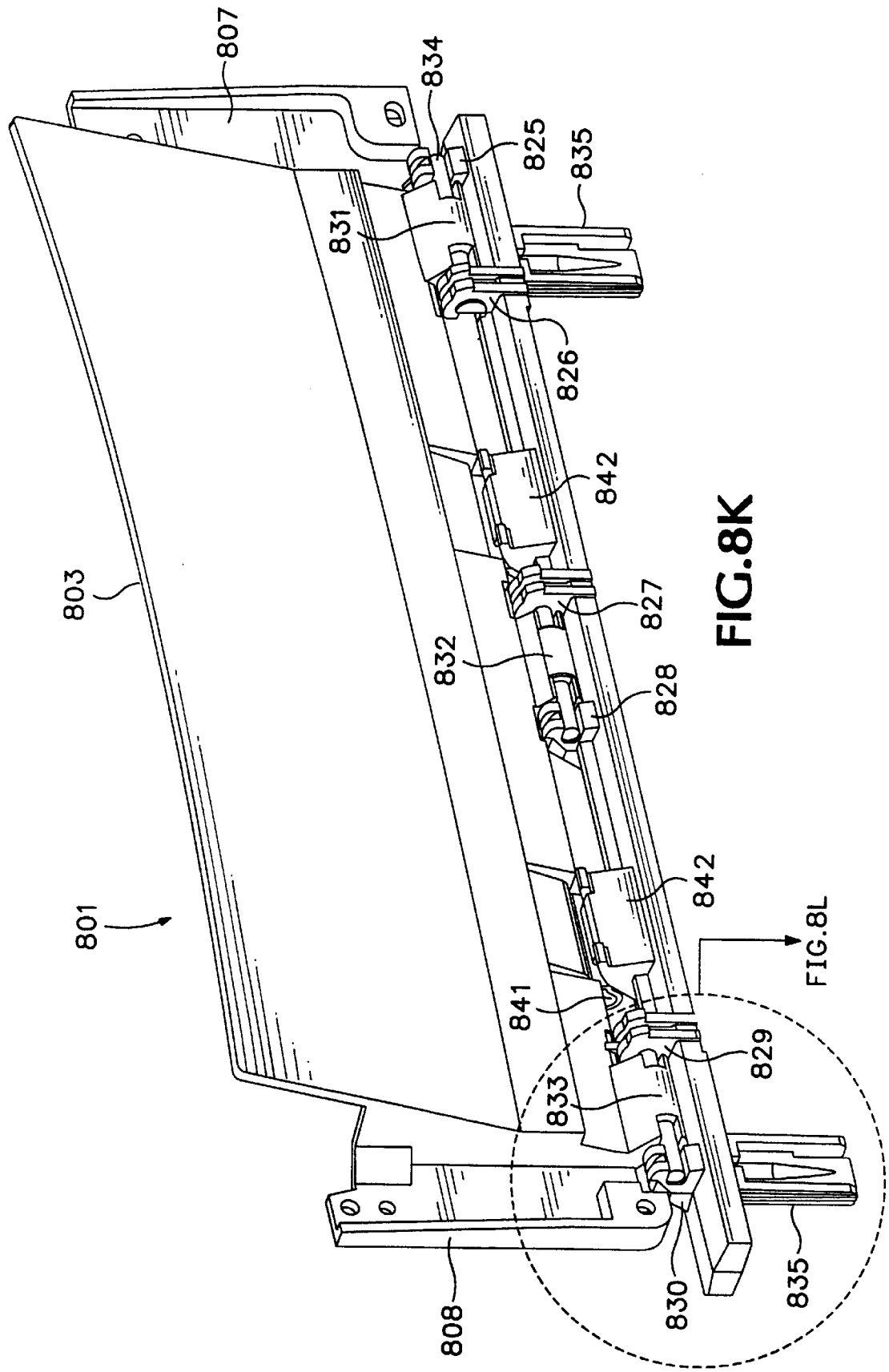
FIG. 8K is a right, rear overhead perspective of the lower chassis with attachment hinge mounted as shown in FIG. 8I.

As the ADF is swivel mounted to the hinge 821, ADF tilt-up stops are provided to facilitate use of the ADF. FIG. 8B shows that the bottom of the lower chassis output document sheet guide and shelf 809 is provided with depending ADF tilt-up stops 841. FIG. 8E shows that the crossbeam 823 of the attachment hinge 821 is provided with rising protrusions that form complementary, hinge tilt-up stops 842. The tilt-up stops 841, 842 in the preferred embodiment are matched such that a 65-degree rotation upward of the ADF is permitted (see detail plane B—B, FIG. 8B). FIGS. 8I–8L depict the interfit of the hinge features with the lower chassis features. FIG. 11 shows the ADF 101 at its upwardly tilted position relative to the bezel 1101. Note that this also facilitates mounting the ADF to a scanner provided with appropriate flange slots or a bezel 1101 with receiving sleeves 1103.

F. Input Tray Paper Stop and Pick

Figure 13:
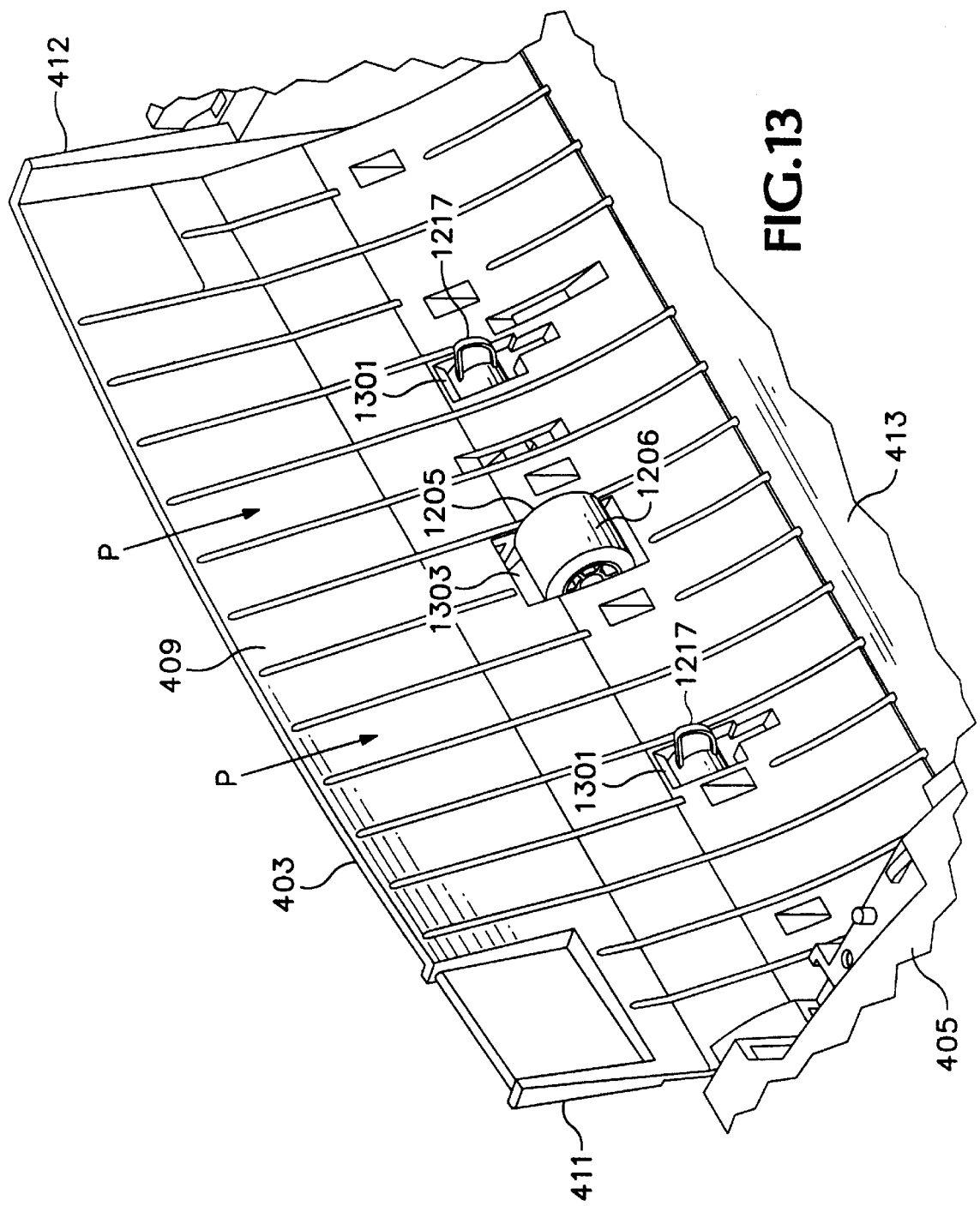
FIG. 13 is a perspective view showing the paper stop and pick mechanism of FIG. 12 in situ in a home position.
Figure 14:
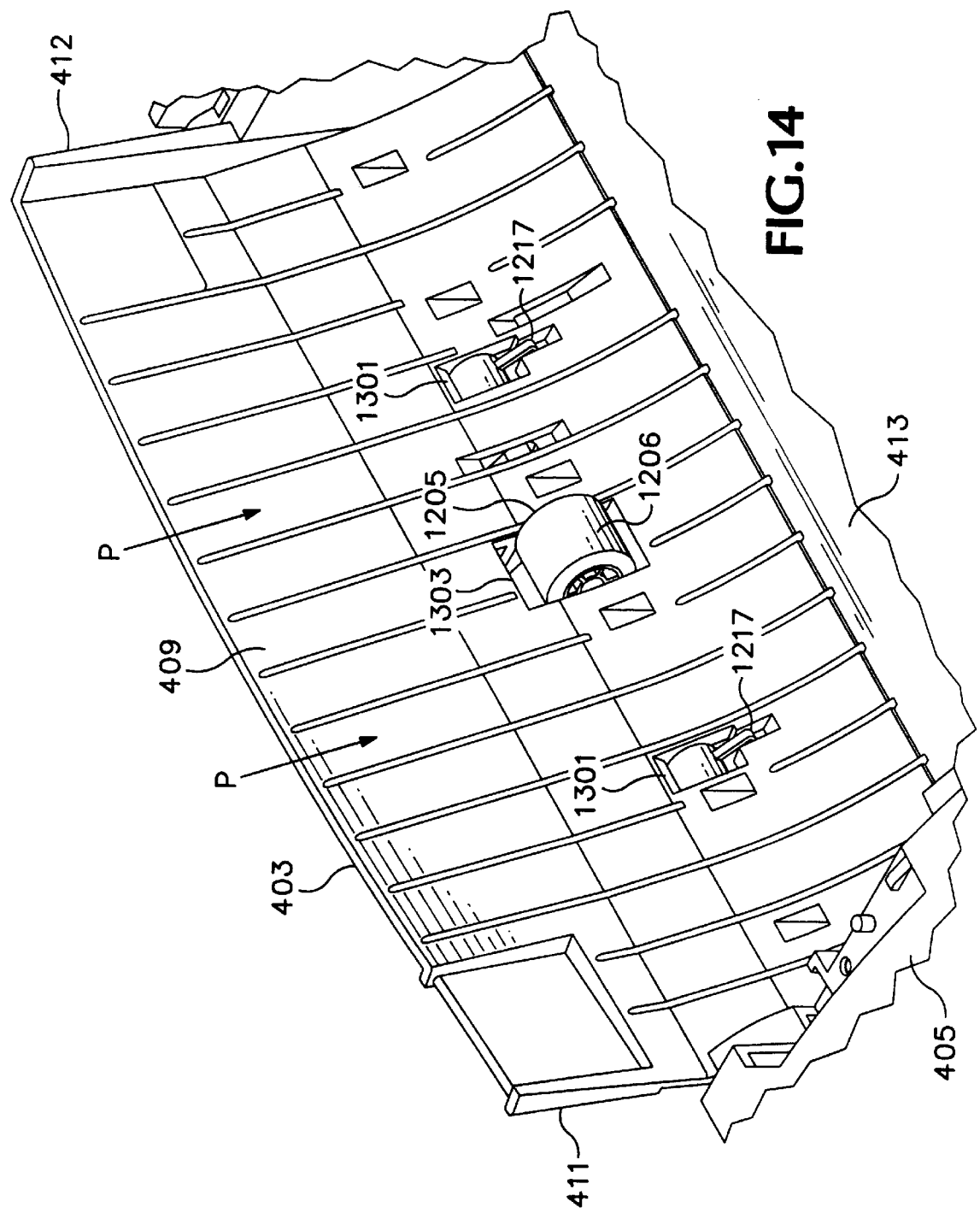
FIG. 14 is a perspective detail drawing showing the paper stop and pick mechanism of FIG. 12 in situ in a paper picking position.

Paper pick and transport mechanisms are also housed by the main chassis 401. FIG. 12 shows an input tray paper stop and pick mechanism 1201 in accordance with the present invention. FIG. 13 shows the paper stop mechanism 1201 mounted in position with respect to the input tray 403 with the mechanism in a paper loading, or "home," position; the upper chassis is not shown in position in this drawing. FIG. 14 shows the paper stop and pick mechanism 1201 mounted in position with respect to input tray 403 with the paper stop and pick mechanism in a "retracted" position as it would be during a paper picking operation.

Centrally mounted on a paper pick and stop shaft 1203 is a paper pick roller 1205. The paper pick roller 1205, generally having a rubber or grit wheel surface, is mounted via a fixed bearing hub 1207. A pair of spaced apart spring loaded paper stop fence devices 1209 are mounted on opposite sides of the pick roller 1205. The stops 1209 protrude into the paper path (P) and support from below a stack of sheets of paper (not shown) loaded into the ADF 101. As an individual sheet is picked from the stack by the pick roller 1205, the stops 1209 temporarily rotate out of the paper path allowing the picked single sheet to fall under the force of gravity from the stack to start a journey along the paper path to the output tray 801 as will be explained in greater detail. Once the picked sheet has cleared the stops 1209, the stops 1209 snap back into the their original resting positions to support from below any remaining sheets in the stack.

The stop fence devices 1209 are mounted on the shaft 1203 and further help to minimize teetering of the paper stack on the pick roller 1205. Considering now the paper stop device 1209 in greater detail with reference to FIG. 12A, each paper stop fence device 1209 includes a housing 1211, a one-way needle clutch 1213, and a biasing torsional spring 1215, biasing the device toward its home position as depicted in FIG. 13. The housing 1211 has extended paper stop fence tabs 1217. The torsional spring 1215 provides enough force on the housing 1211 such that the tabs 1217 can support a number of sheets of a document (e.g., 50 sheets of legal size paper of up to 24-pound type). In operation, when a document is loaded (see arrows labeled "P") into the input tray, face down—i.e., with the print side facing input tray surface 409—the paper sheets (not shown) have their side edges sitting on the top edges of the paper stop fence tabs 1217 which are protruding substantially horizontally through aligned apertures 1301 provided in the surface 409 of the input tray 403. Similarly, an aperture 1303 is provided in the input tray surface 409 for the paper contact surface 1206 of the pick roller 1205 to extend forwardly of the input tray 403.

A paper pick drive shaft 1203 connects the paper stop and pick mechanism 1201 to a stepper motor 103. Turning briefly to FIG. 15, the mounting of the drive shaft 1203 to a motor 103 is made with standard bushings 1501.

As a sheet of paper is center-picked, the force of a moving document sheet imparted by the pick roller 1205 is sufficient to release the clutch 1213 and push the tabs 1217 out of the way as shown in FIG. 14. The torsional spring 1215 causes the tabs 1217 to bounce back to the home position after the trailing edge of the paper clears the outermost point on the tabs. In other words, by adding a paper stop and pick mechanism 1201, the present invention takes advantage of the vertical input tray 403 in that paper falls into the pick roller by gravity, eliminating the need for pre-picking mechanism.

G. Paper Drive/Document Backing

Figure 16:
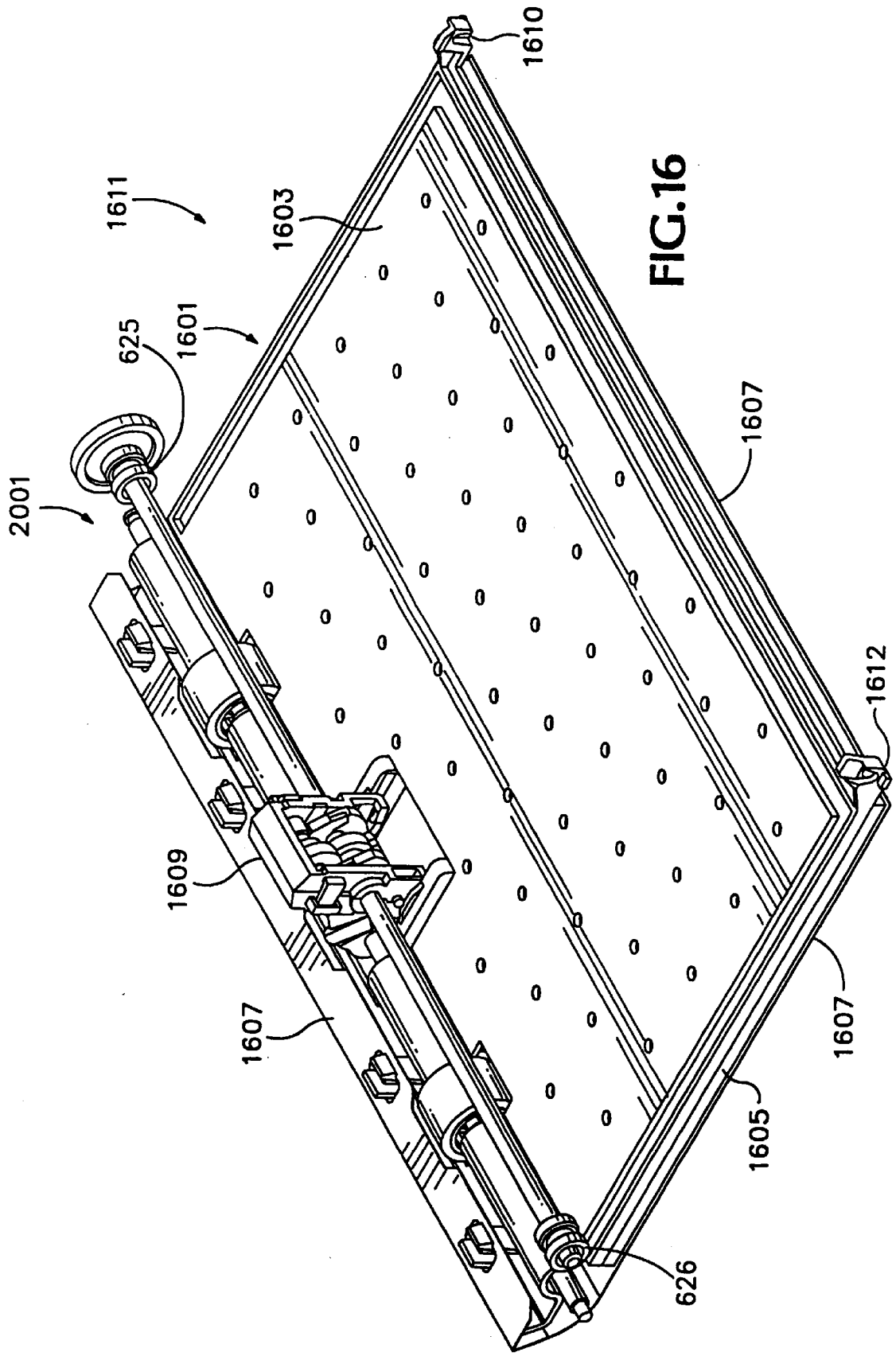
FIG. 16 is a perspective overhead view of a document sheet backing mechanism in accordance with the present invention as shown in FIG. 10.

A paper drive and document backing mechanism is mounted to the under-carriage of the main chassis 401. FIG. 16 shows an assembled paper drive 2001 (detailed in FIG. 20) and a document backer 1601, referred to in the assembled combination as a paper pressure mechanism 1611.

The ADF of the present invention uses the technique of sequentially loading and unloading original document sheets onto the scanner flat bed glass 1701 (FIGS. 17–19) using a document backing method taught in U.S. patent application Ser. No. 08/651,066 (Hendrix et al.), supra. In order to provide the highest quality scanned version, it is desirable to press the document sheets firmly against the glass 1701 of the scanner. The assembly forming a document backer 1601 includes a lift plate 1603 is a substantially rigid, planar material, such as a molded ABS plastic. Mounted on the lower surface of the lift plate 1603 is a foam rubber pad 1605, preferably of polyurethane, commercially available from Boyd company of 13885 Ramona Avenue, Chino, Calif., providing a document backing pressure pad for a document sheet on the scanning bed glass 1701 at a scanning station. To the lower surface tension of the foam pad, a thin plastic film 1607 preferably of polycarbonate film, trade name "Lexan", commercially available from General Electric company of One Plastics Avenue, Pittsfield, Mass. 01201, is provided to act as a low-friction contact with document sheets.

The combination of materials used in the document backer assembly 1601 and the lifting of the assembly during loading and unloading of print media sheets from the flat bed of a scanner, or bezel, not only reduces the friction, but also minimizes the electrostatic build-up, improving reliability of sheet feeding.

In the preferred embodiment, the document backing assembly 1601 is mounted to the undercarriage of the main chassis 401 by slipping the assembly through the main chassis first cavity 413. The document backing assembly 1611 is inserted through the first cavity 413 of the main chassis 401; front hooks 1610, 1612 mate with molded features of the main chassis under carriage toward the front thereof; spring 1614 loaded bushings 1613 are provided to hold the document backing assembly 1601 in molded features of the main chassis toward the rear thereof, adjacent the first cavity 413 as shown in FIG. 10A. The present invention solves the problem of getting a document sheet between the glass 1701 and the plastic film 1607 by lifting the assembled paper drive 2001 and document backer 1601 as the document sheet is loaded and unloaded from the glass. A lift cam mechanism 1609 moves between:

(1) a forward position as shown in FIG. 17, lifting the document backing assembly 1601 to permit a sheet of paper to enter between the assembly and the scanner bed glass 1701 as indicated by arrow 1611, (2) a central position as seen in FIG. 18, dropping the document backing assembly 1601 onto the scanner bed glass 1701, and (3) a rearward position as shown in FIG. 19, lifting the document backing assembly 1601 to permit a sheet of paper to be driven off the scanner bed glass 1701 as indicated by arrow 1613.

The cam lift mechanism 1609 will be described hereinafter in greater detail.

Figure 20:
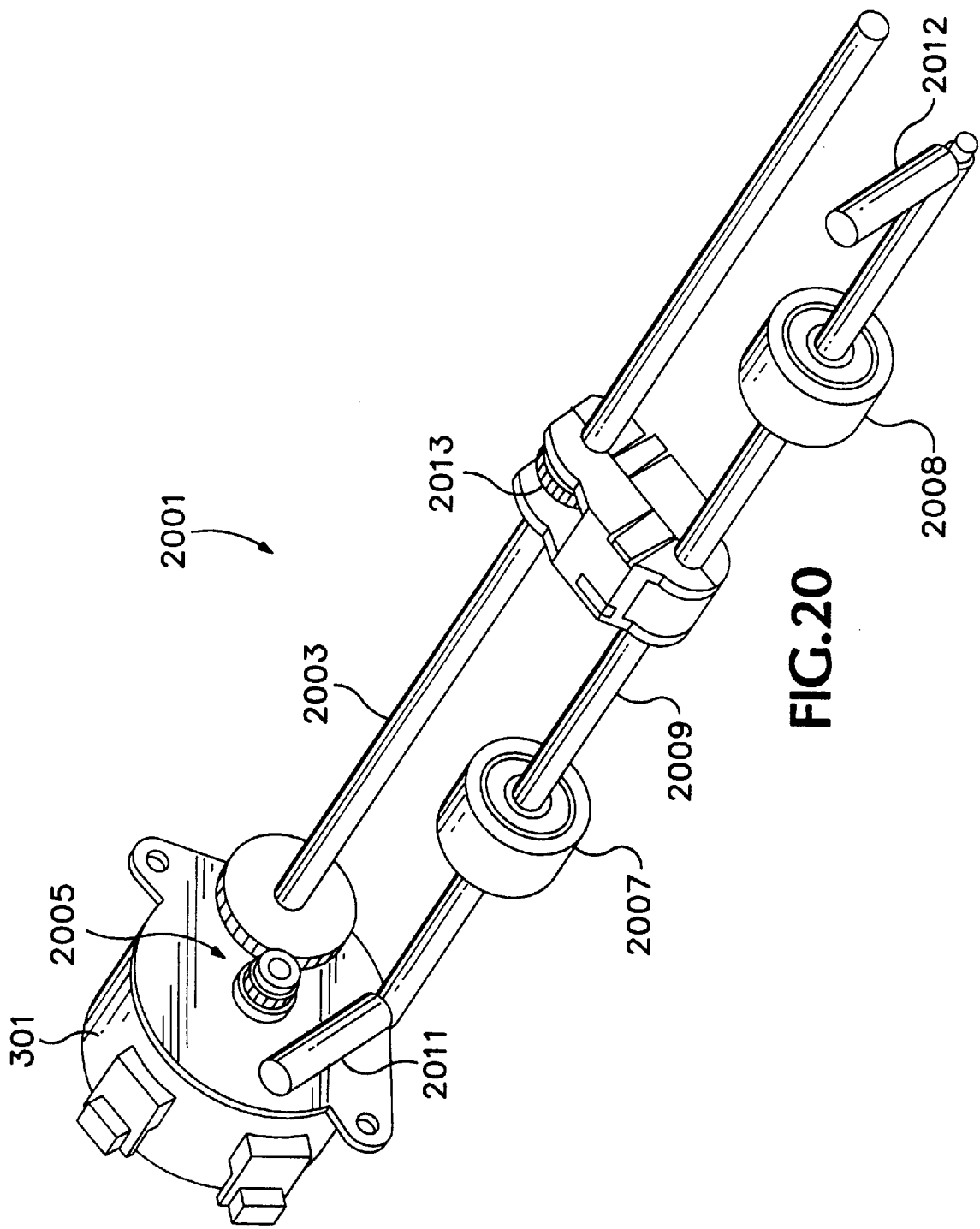
FIG. 20 is a perspective drawing of the paper drive mechanism in accordance with the present invention as shown in FIG. 10.

FIG. 20 shows detail of the paper drive mechanism 2001. The reversible stepper motor 301 is coupled to a transfer shaft 2003 via a conventional gear train, or other transmission, 2005. A pair of paper drive rollers 2007, 2008 are mounted on a paper drive roller axle 2009. The paper drive roller axle 2009 has spring-loaded mountings 2011, 2012 to the ADF main chassis 401 structure as depicted in FIG. 15. A gear train linkage 2013 is used to turn the paper drive rollers 2007, 2008 via axle 2009 at the approximate midpoint of the axle. The gear train linkage 2013 moves with the axle and pivots about the transfer shaft 2003. Note that both the motor 301 and the transfer shaft 2003 is rigidly mounted to the ADF main chassis 401 structure. As a result of this configuration, the normal force of the two drive rollers 2007, 2008 is balanced because the gear train linkage force is applied in the middle of the two drive rollers and therefore is equally distributed. The balanced normal force ensures loading and unloading of sheets of the document without skew. In short then, the spring loaded drive axle 2009 coupled to the system transmission system activates the elastomeric drive roller 2007 and 2008 to help facilitate the loading and unloading of a document sheet onto the supporting surface of the flat bed scanner 1101 without any substantial paper skew. The gear train linkage 2013 is used to provide motion to a lift cam during paper loading and unloading to hoist the document backer 1601 off the glass (FIGS. 17 and 19).

H. Paper Path

Figure 9A:
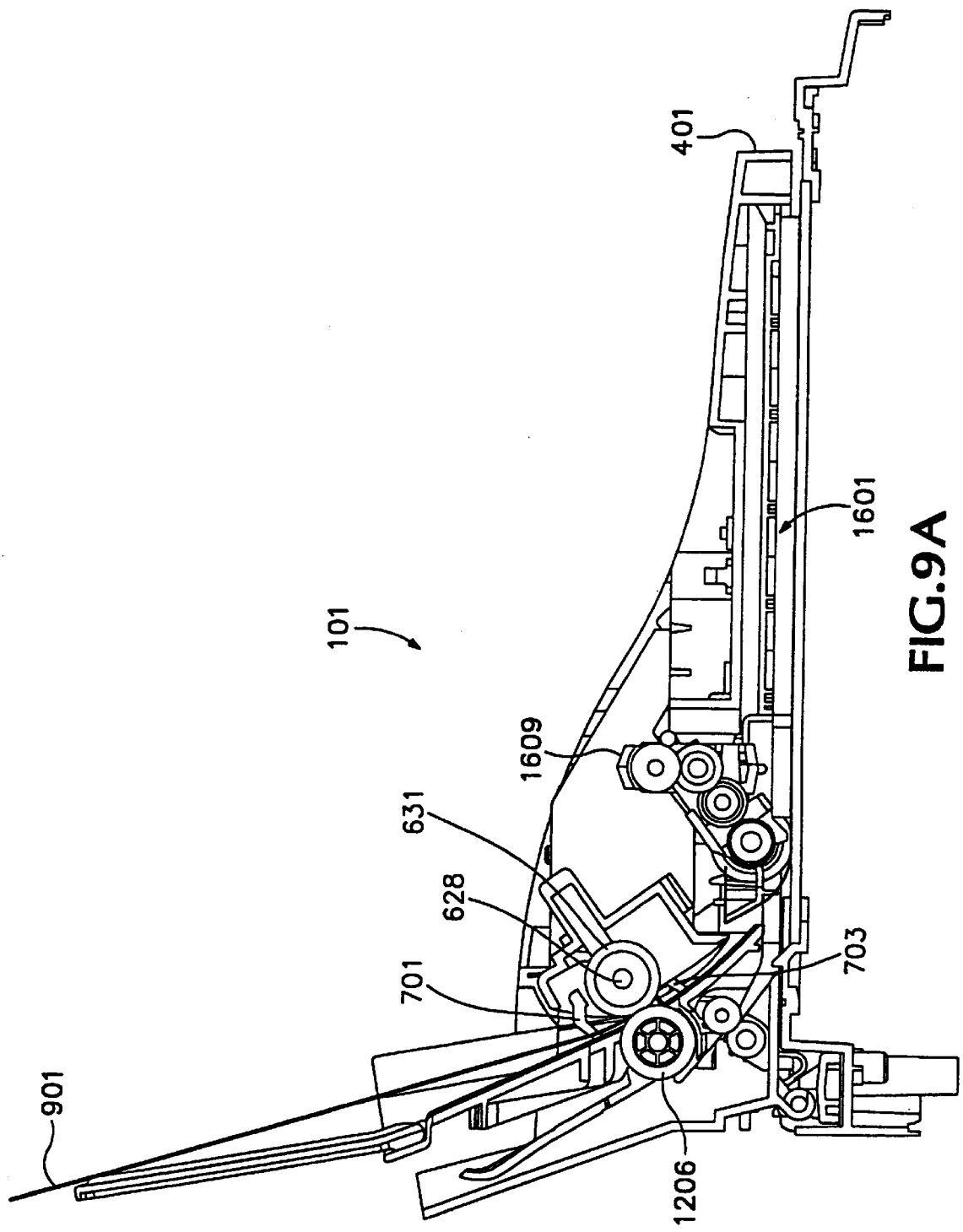

FIGS. 9A–9G depict the dynamics of the paper path established by the main chassis 401, upper chassis 601 and lower chassis 801. In this embodiment, a bezel 902 is attached to the FIG. 9A shows the apparatus 101 in the condition where a document sheet 901 is loaded. The paper stop and pick mechanism 1201 is in the position shown in FIG. 13, and the document sheet 901 is resting on the two paper stop and pick mechanisms 1201 and paper pick roller 1205. The lift cam mechanism 1609 is in the same position as shown in FIG. 18, with the document backing assembly 1601 in its lowered position.

Figure 9B:
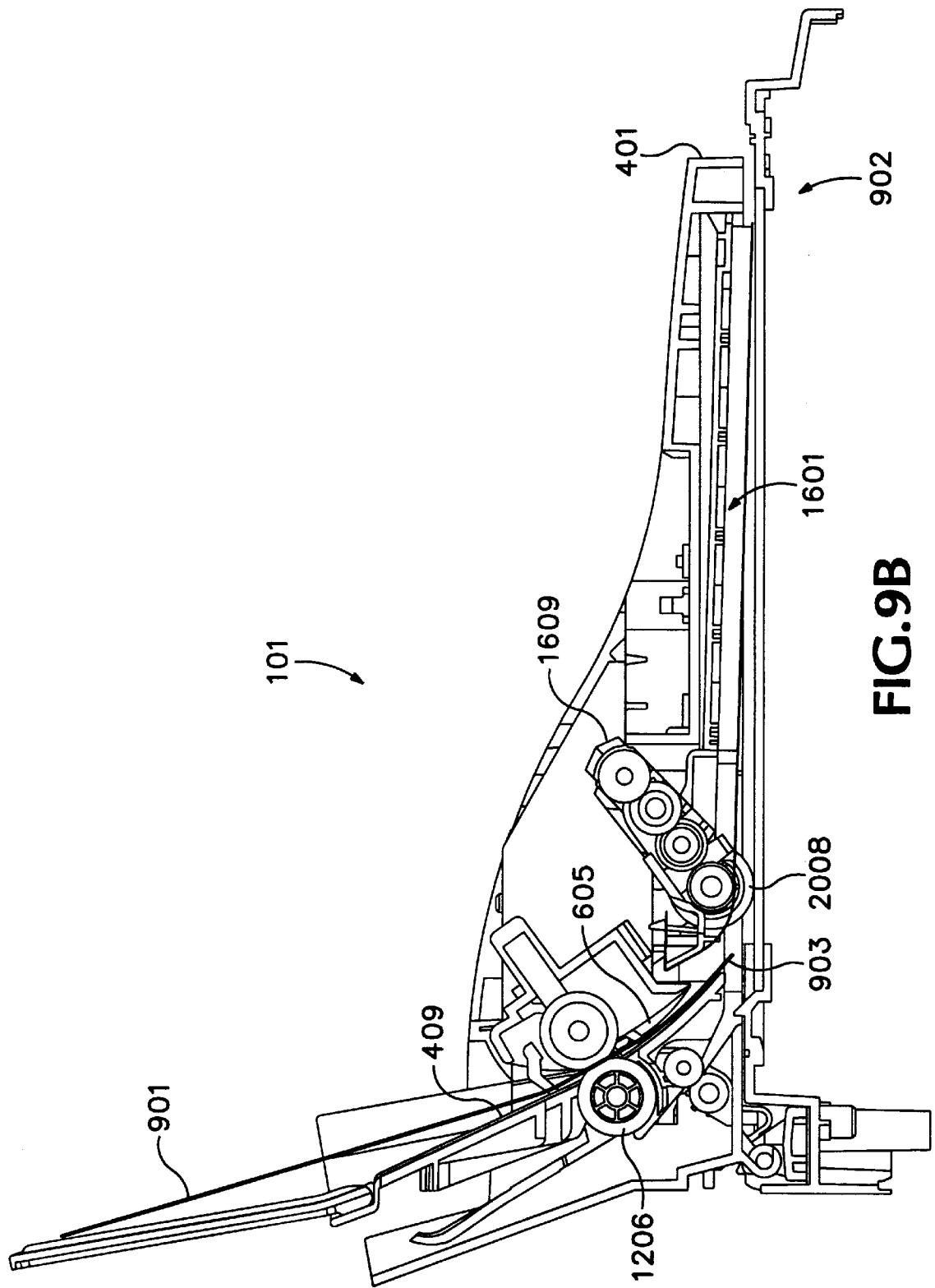
Figure 9E:
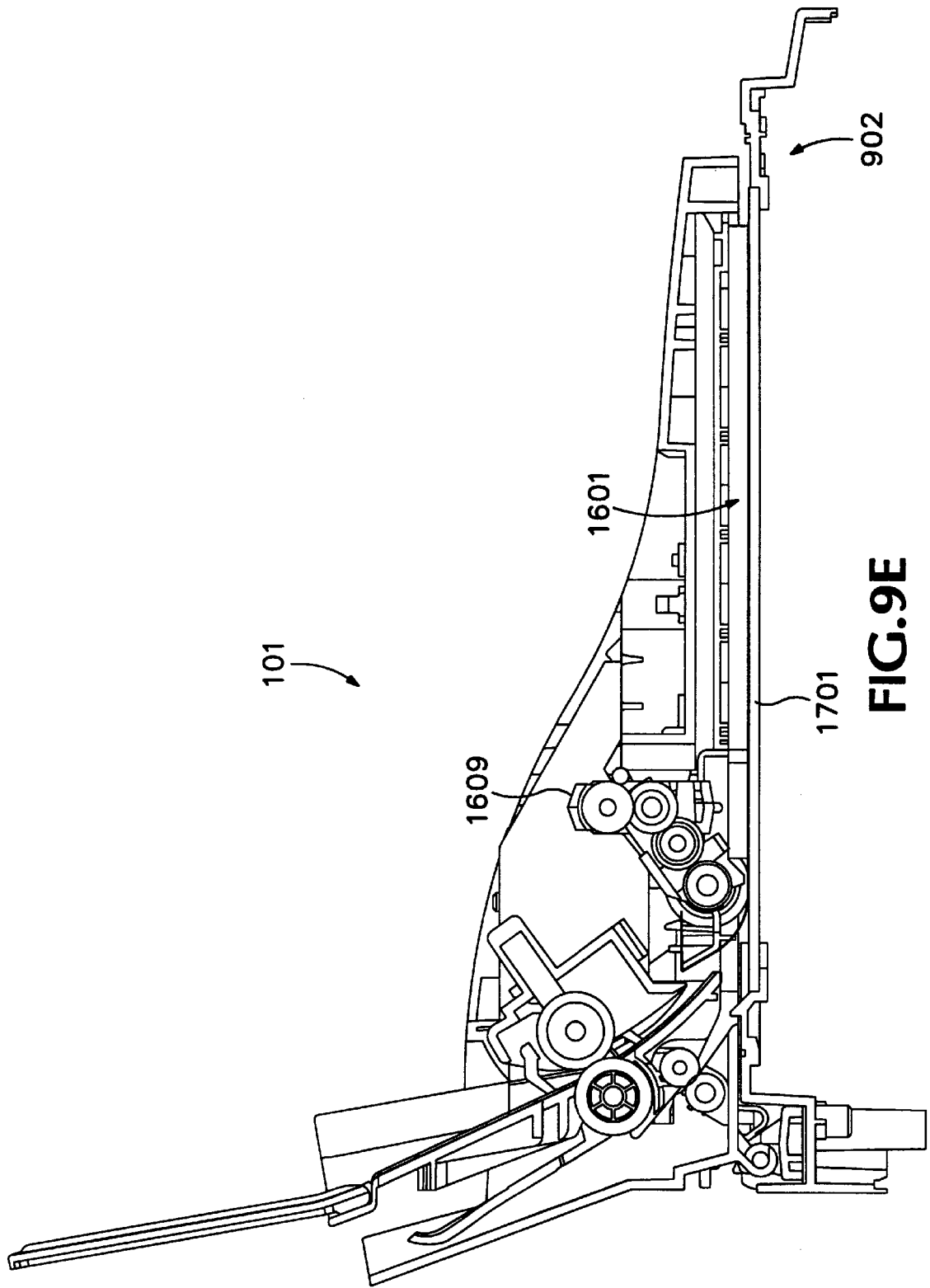

FIG. 9B demonstrates pertinent apparatus feature positions during a paper pick operation. The paper pick roller 1205 is motor-activated, turning so as to pull the sheet 901 downward into the tray. The sheet 901 is fed downward and shaped between the input tray surface 409 and the upper chassis 601 fins 605. The tabs 1217 of the paper stop and pick mechanism 1201 are moved out of the way by the sheet 901 as described with respect to FIG. 12. The leading edge 903 of sheet 901 is directed toward the drive rollers 2007, 2008. Activation of the drive rollers 2007, 2008, turning in a rotation that will receive the leading edge 903 of sheet 901 and direct it toward the scanning station, also moves the cam mechanism 1609 to its forward position, lifting the document backing assembly 1601 such that the sheet will slip underneath.

During a paper pick cycle, as shown in FIG. 9C, the leading edge 903 of the sheet 901 contacts the surface of the glass bed before reaching the drive rollers 2007, 2008. It has been found that the buckling of the sheet as it impacts the glass 1701 and before reaching the drive rollers 2007, 2008 de-skews any offset of the sheet.

Turning to FIG. 9D, the drive rollers 2007, 2008 drive the sheet onto the glass 1701. The trailing edge of sheet 901 remains in contact with the drive rollers 2007, 2008 when the sheet is positioned for scanning. The lift cam mechanism 1609 returns to its center position and drops the document backing assembly 1601 onto the sheet 901.

Figure 9G:
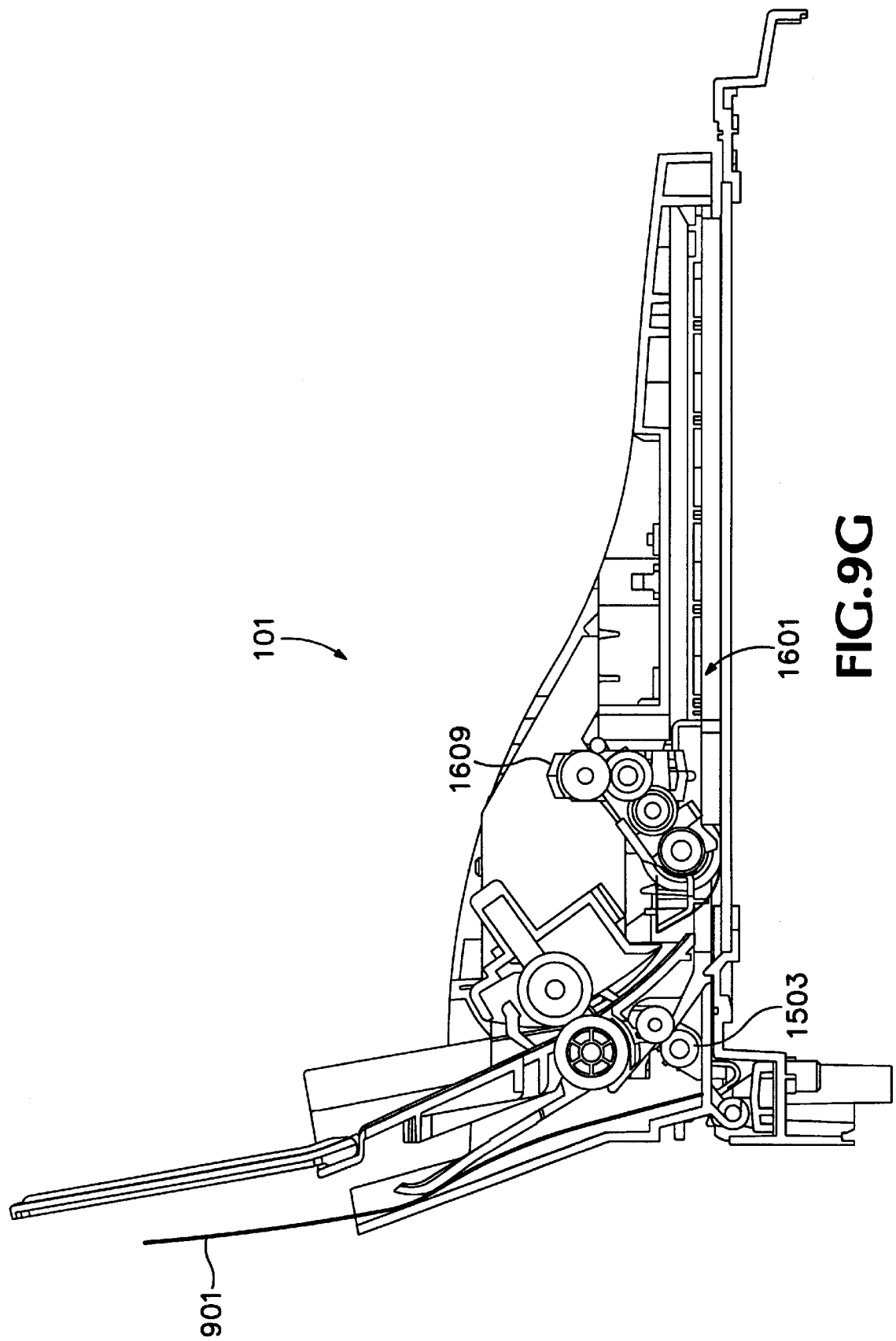

Following scanning, as shown in FIG. 9F, the drive rollers 2007, 2008 are driven in a reverse direction from a sheet feed cycle. The lift cam mechanism 1609 is moved to its rearward position as shown in FIG. 19, lifting the document backing assembly 1601 to permit a sheet of paper 901 to be driven off the glass 1701. The trailing edge of the sheet 901 that had been retained under the drive roller 2007, 2008 has now become the exit "leading edge" 905 of the sheet. The lower chassis output document sheet guide and shelf 809 receives the exit leading edge 905. The sheet is driven between the output tray drive rollers 1503 (see also FIG. 15). The output tray drive rollers 1503 directs the sheet 901 upwardly into the output tray 803 where it is retained behind the shelf 809 as shown in FIG. 9G. The lift cam mechanism 1609 is returned to its center position.

I. Lift Cam Mechanism

Referring now to the drawings and more particularly to FIGS. 9A–G and 21–25 there is shown a lift cam mechanism 1609 that facilitates the lifting of an assembled paper drive 2001 and document backer 1601 during the loading and unloading of a document sheet onto the transparent glass supporting surface 1701. In this regard, the lift cam mechanism 1609 solves the problem of transporting such a document sheet between the supporting surface 1701 and the plastic film 1607 during such loading and unloading operations.

Considering now the lift cam mechanism 1609 in greater detail with reference to FIGS. 9A–G and 21–25, the lift cam mechanism 1609 generally includes a cam linkage indicated generally at 1615, and a differential gear train arrangement indicated generally at 1617. The cam linkage 1615 and the differential gear train arrangement 1617 in combination facilitate a passive automatic lifting action of the document backer 1601 to substantially reduce friction and electrostatic build up for reliable sheet feeding purposes.

As best seen in FIGS. 21–25, the cam linkage 1617 generally includes an elongated transfer shaft 2003 that is supported for rotational movement between a motor plate 1619 and the chassis 401. A pair of transfer gears, 8001 and 8002 respectively, are pressed mounted spaced from one another on the shaft 2003 to facilitate a lifting action enabled by a free spinning lift cam 8005 that will be described hereinafter in greater detail.

The transfer gear 8001 has a larger diameter than the transfer gear 8002 and is mounted relative to the shaft 2003 so that it engages a motor pinion gear 1621 extending from the drive motor 103. In this manner, the motor pinion gear 1621 translates the rotational drive of the motor 103 to the transfer gear 8001 that in turn causes the shaft 2003 to be rotated about it axis at a desired rotational speed.

The lift cam 8005 and a free spinning transfer idler gear 8003 are mounted inwardly of the transfer gear 8002 on the shaft 2003. The idler gear 8003 and the lift cam 8005 are slightly spaced from one another with the lift cam 8005 being mounted furthest from the distal end of the shaft 2003. An elongated lift cam pin 8006 is mounted fixedly by wedging to the lift cam 8005 and extends outwardly therefrom parallel to the shaft 2003. Mounted to the distal end of the lift cam pin 8006, is a free spinning lift cam composite gear 8004, having a small diameter portion and a large diameter portion. The small diameter portion engages the idler gear 8003 and the large diameter portion engages the transfer gear 8002.

In order to move a document onto and off the scanner bed glass supporting surface 1701, a free spinning drive roller 2007 is pressed mounted to a drive shaft 2009 having a press fitted drive gear 8008 mounted to its distal end. The drive shaft 2009 is mounted spaced from and parallel with the transfer shaft 2003 and is supported between the motor plate 1621 and a free spinning cluster housing 8010. The cluster housing 8010 mounted inwardly of the drive gear 8008 and is supported on and between the transfer shaft 2003 and the drive shaft 2009. The cluster housing 8010 has fixed thereto an elongated housing pin that extends outwardly therefrom in a plane parallel with the shafts 2003 and 2009. A free spinning cluster housing composite gear 8007 is mounted on the pin 8009 between shafts 2003 and 2009. The composite gear 8007 includes a large diameter portion that engages the drive gear 8008 and a small diameter portion that engages the transfer idler gear 8003 to further facilitate a lifting action as will be hereinafter described.

Figure 24:
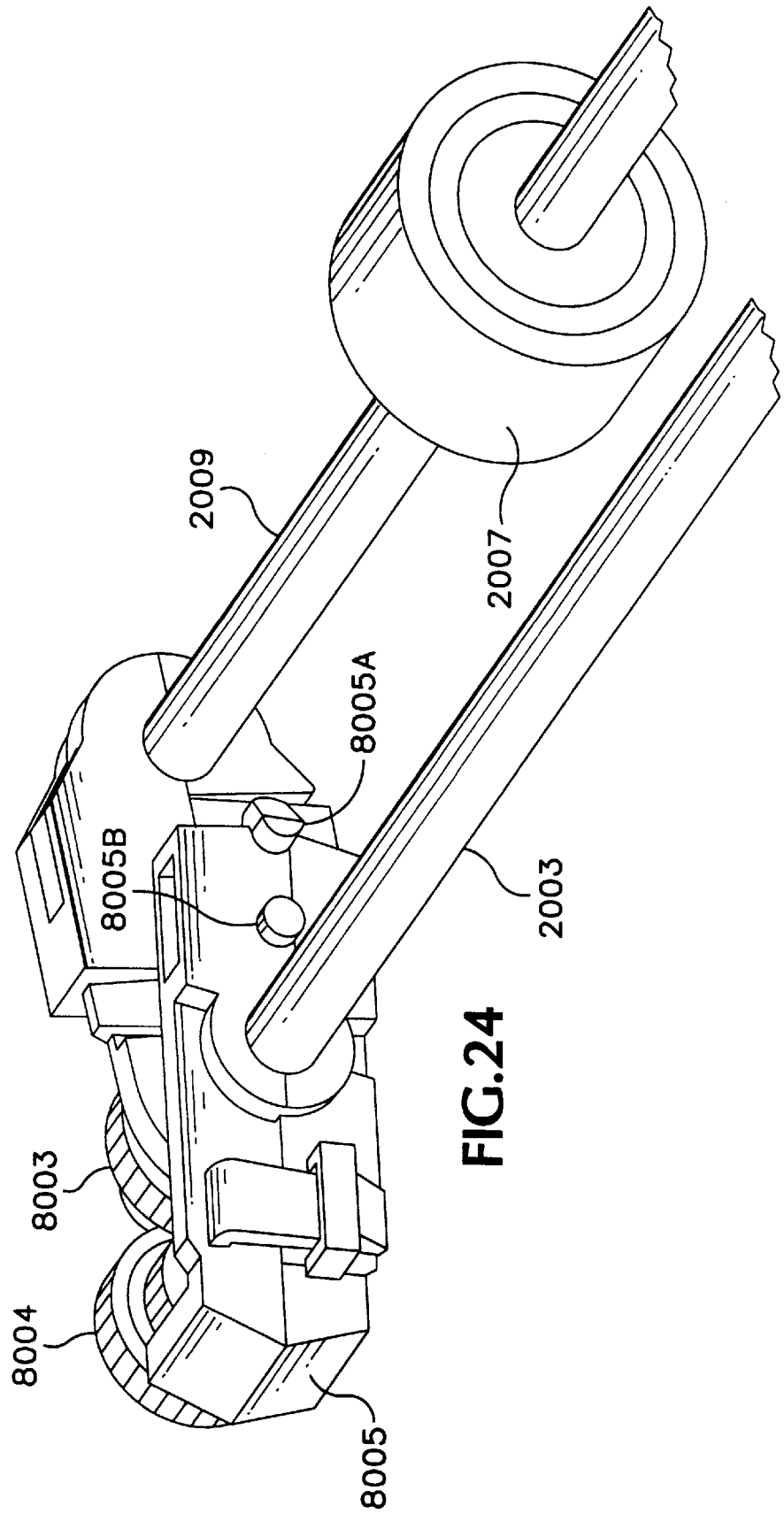
Figure 25:
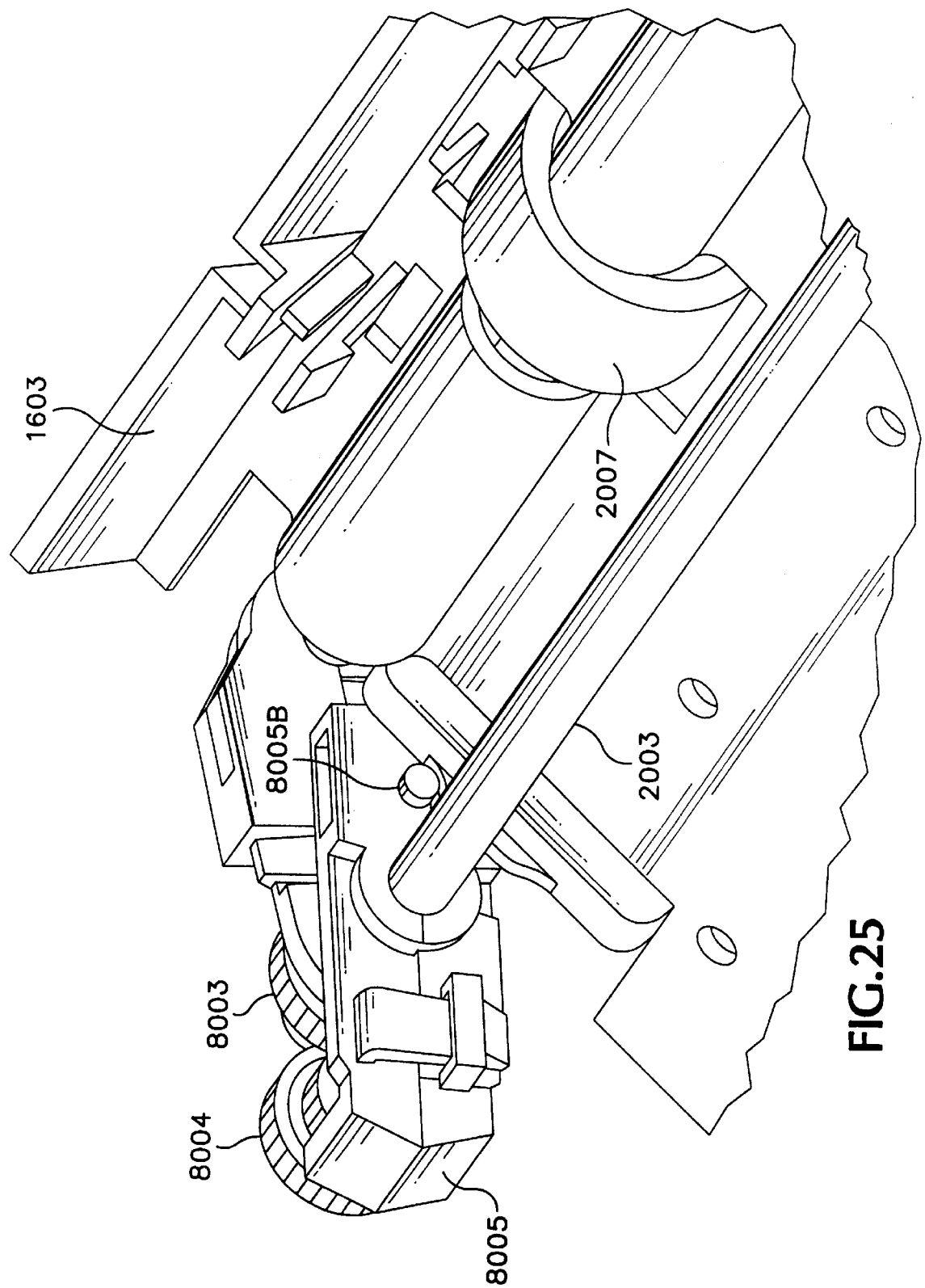

As best seen in FIGS. 24–25, the lift cam 8005 includes a pair of spaced apart stops 8005A and 8005B that limit the movement of the lift cam 8005 as will be explained hereinafter in greater detail.

Figure 21:
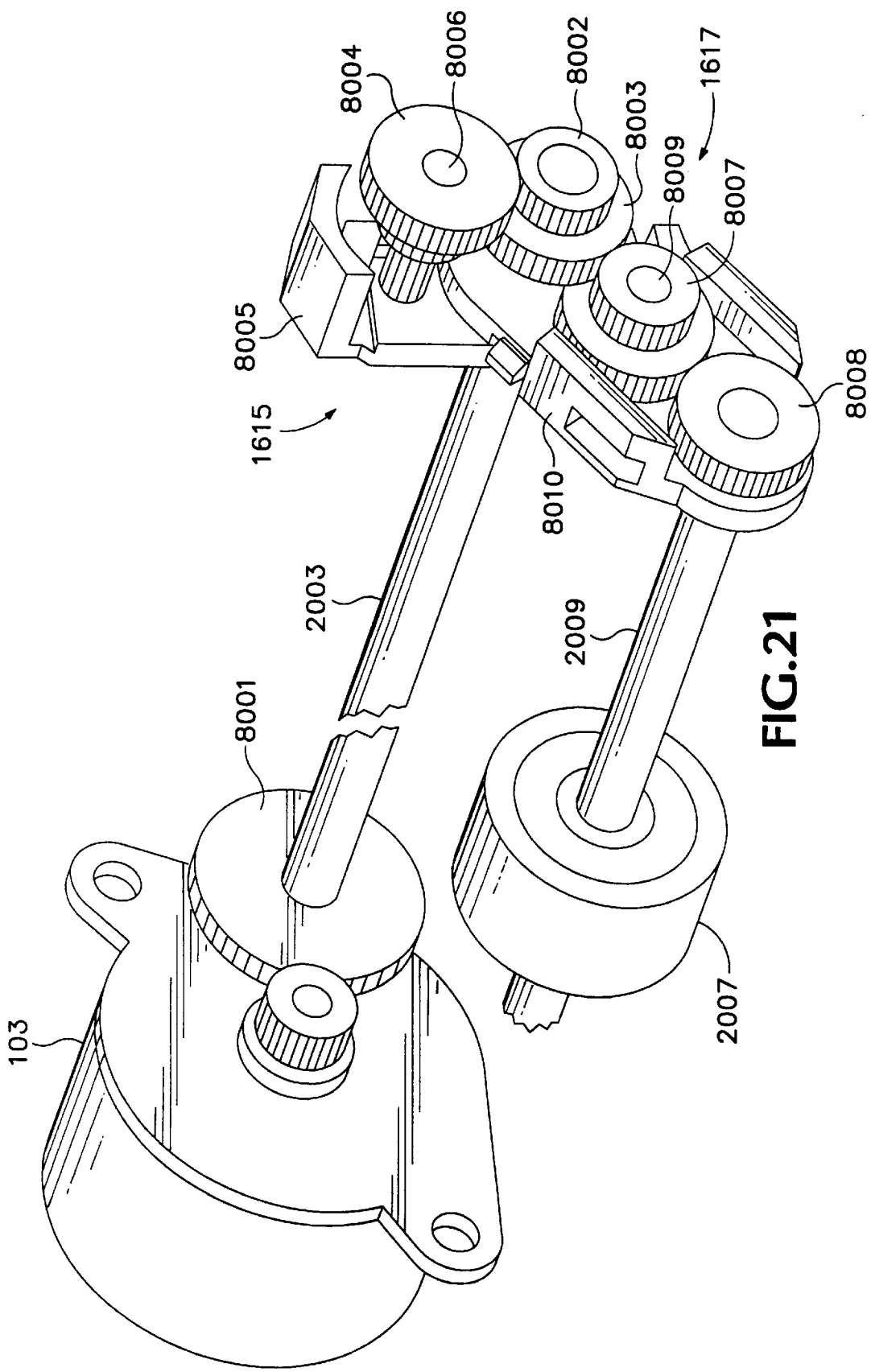
FIGS. 21–25 illustrate the mechanical operation of the lifting mechanism.

Considering now the operation of the lift cam mechanism 1609 with reference to FIGS. 9A–G and 21–23, the lift cam 8005 begins in a down position as best seen in FIG. 21.

As the motor pinion gear rotates in a clockwise direction in engagement with the transfer gear 8001, the transfer gear 8001 imparts a counter clockwise rotation to the transfer shaft 2003. The transfer shaft 2003, in turn, causes the lift cam 8005 to lift and to move to a final lifted position as shown in FIG. 22.

More particularly, as the transfer gear 8002 is fixed to the shaft 2003, the gear 8002 rotates in the same counter clockwise direction and at the same rotational speed as that of the shaft 2003. The idler gear 8003, however, remains in a fixed position due to the friction between the drive roller 2007 and the scanner glass bed 1701. In this regard, the idler gear 8003 locks the gear train of gears 8003, 8007 and 8008. In a like manner as the gear train of gears 8003, 8008 and 8009 is fixed, the drive shaft 2009, its associated drive roller 2007 and cluster housing 8010 also remain fixed in their respective positions. However, the free spinning lift cam composite gear 8004, rides along the transfer gear 8002 and the idler gear 8003, and rotates in response to cause the lift cam 8005 and lift cam pin 8006 to move in unison, pivoting in a clockwise direction relative to the transfer shaft 2003.

Figure 22:
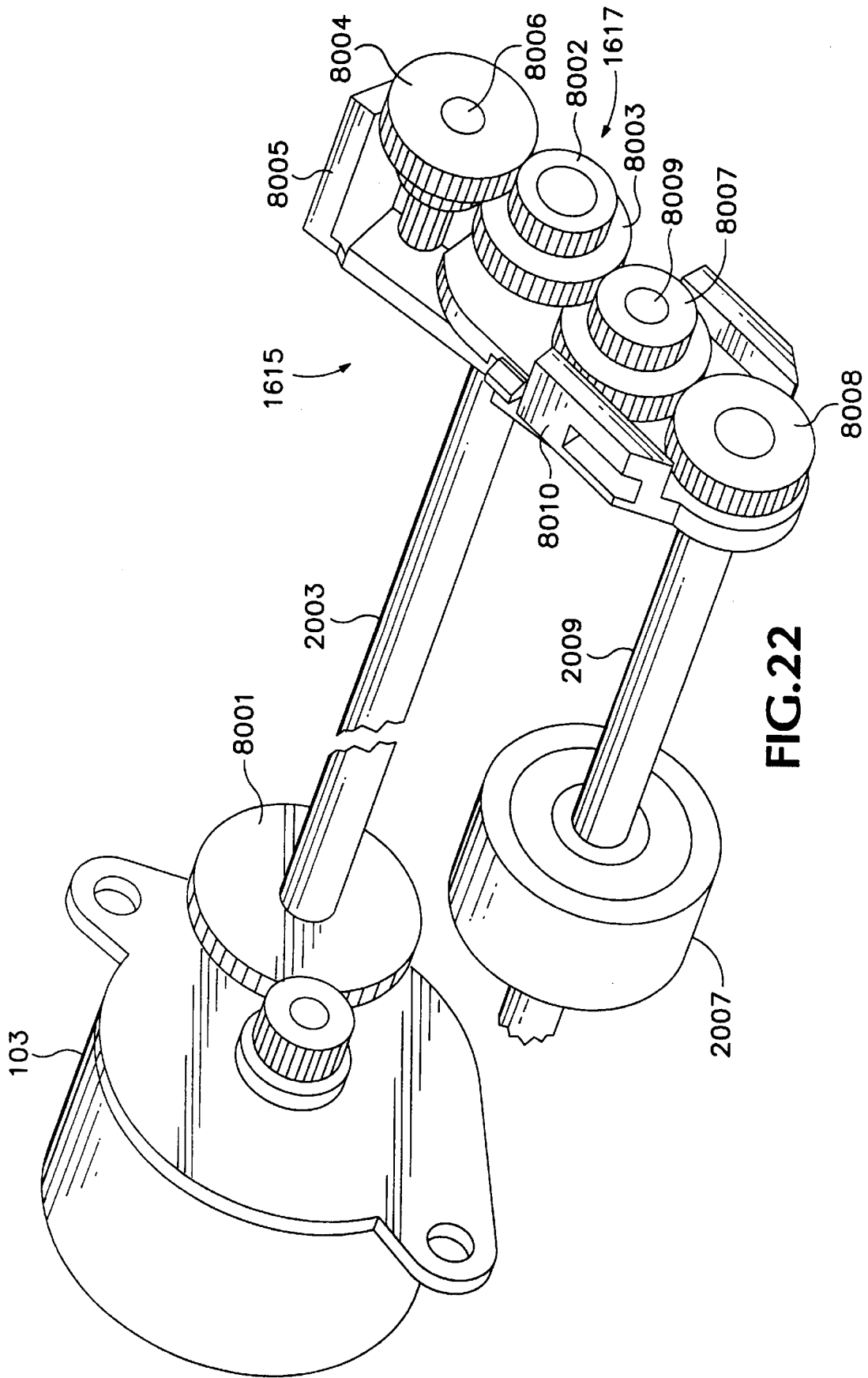

Once the lift cam 8005 has moved to its final lifted position as illustrated in FIG. 22, the drive roller 2007 starts driving the document forward. More particularly, the drive roller 2007 imparts motion to the document in the following manner. Motion of the lift cam 8005 is inhibited by the stops 8005A and 8005B that are wedged on the lift plate 1603. With the lift cam in a fixed position, the lift cam composite gear 8004 continues to rotate on pin 8006 in a clockwise direction that now in turn, imparts a rotational motion to the gear train comprising gears 8003, 8007 and 8008. In this regard, the gear 8003 is rotated in a counter clockwise direction, which motion is coupled to the drive gear 8008 via the clockwise motion of gear 8007 about pin 8009. From the foregoing, it should be understood that the document is now pulled forward under the frictional force of the drive roller 2007. The drive roller 2007 rotates in a counter clockwise direction due to the cluster housing 8010 being held in a fixed position, while the gear 8007 rotates about pin 8009 to impart rotational motion to drive gear 8008 and shaft 2009.

After the document has been moved into a proper position for scanning, the lift cam 8005 is moved to its original down position as illustrated in FIG. 21. In this regard, the transfer shaft 2003 starts to rotate in an opposite clockwise direction, that in turn, causes the transfer gear 8003 to rotate in the same clockwise direction. The lift cam composite gear 8004 riding along gears 8002 and 8003 rotates in an opposite direction causing the lift cam 8005 and its associated pin 8006 to pivot on the transfer shaft 2003. Motion of the drive roller 2007, drive shaft 2009 and the cluster housing 8010 remain fixed as no rotation motion is imparted via gears 8007 and 8008. In this regard, it should be understood that as the motor pinion gear rotates in a counter clockwise direction, it imparts a clockwise motion to the transfer shaft 2003 via the transfer gear 8001. The rotation of the transfer shaft 2003 causes the transfer gear 8002 to rotate in the same direction at the same rotational speed, while the idler gear 8003 remains in a stationary position. Again, the friction between the drive roller 2007 and the document locks the gear train comprising the gears 8008, 8007, and 8003. Thereafter, the lift cam 8005 remains in a fixed position while the document is scanned.

After the document has been scanned, the lift cam 8005 is lifted to permit the document to be moved off of the scanner glass bed 1701. In this regard, the motor pinion gear is rotated in a counter clockwise direction that in turn imparts a clockwise rotation to the transfer shaft 2003 and the transfer gear 8002. That is shaft 2003 rotates via the engagement of the transfer gear 8001 with the motor pinion gear, and the gear 8002 rotates as it is fixed to the shaft 2003. As explained earlier, the friction between the drive roller 2007 and the document locks the gear train of gears 8003, 8007 and 8008 in a fixed position.

The lift cam 8005 then begins to lift. The composite gear 8004 free spins on pin 8006 and rides along gears 8002 and 8003 causing the lift cam 8005 and its fixed pin 8006 to pivot about the transfer shaft 2003. The drive roller 2007, and drive shaft 2009 however remain in a fixed position. In this regard, the housing cluster 8010, and gears 8007, 8008 remain fixed thus, no rotational motion is imparted to the drive shaft 2009. The final lifted position of the lift cam 8005 is illustrated in FIG. 23, where the stop 8005A and 8005B inhibit further motion by the lift cam 8005.

Figure 23:
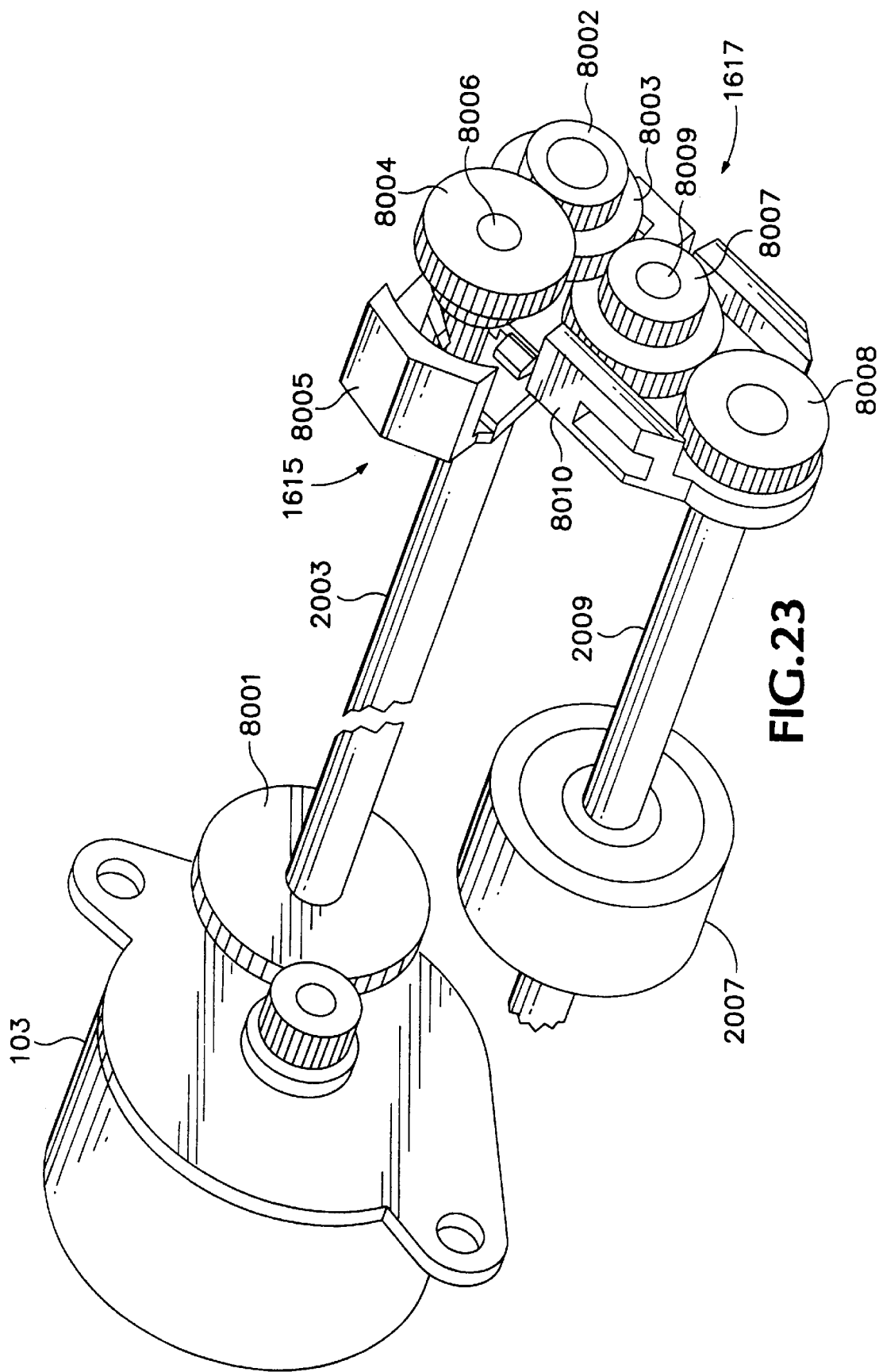

Once the lift cam 8005 has been lifted to its final position as illustrated in FIG. 23, the document is now ejected out from its supporting position on the scanner glass bed 1701. In this regard, while the transfer shaft continues to rotate in a clockwise direction, the lift cam composite gear 8004 rotates in a stationary position counter clockwise about pin 8006. The rotation of gear 8004 is imparted to gear 8007, which in turn rotates the drive gear 8008, drive shaft 2009 and drive roller 2007 in a clockwise direction. In this manner, the clockwise rotation of the drive roller 2007 moves the document off the scanner bed 1701 in a reverse direction.

After the document has been removed from the scanner bed 1701, the pinion gear rotational direction is reversed, which in turn, causes the transfer shaft 2003 to rotate in a counter clockwise direction. The counter clockwise rotation of the shaft 2003 imparts motion to the lift cam 8005 to return it to a down position. More particularly, the composite gear 8004 rotates in a clockwise direction and rides along gears 8002 and 8003 causing the lift cam 8005 and its associated pin 8006 to pivot about the transfer shaft 2003. The friction between the drive roller 2007 and the glass scanner bed 1701 locks the gear train 8008, 8007, and 8003 in a fixed position. The lift cam 8005 comes to rest in it down position read for the next document.

From the foregoing, it should be understood by those skilled in the art that the lift cam 8005 is driven in a predetermined sequence that starts with the lift cam 8005 being position in a down position as illustrated in FIG. 21 and ending in the same down position.

The sequence includes:
1. moving the lift cam 8005 upwardly from a down position to an extended position that permits the document to be moved onto the scanner bed 1701;
2. driving the document onto the scanner bed 1701 via the drive roller 2007;
3. lowering the lift cam 8005 to its down position prior initiating a scanning operation;
4. waiting for the document scanning operation to be completed;
5. moving the lift cam 8005 upwardly from the down position to the extended position to permit the document to be moved off of the scanner bed 1701.

Waiting for a complete document scanning operation to be performed;
6. driving the document in a reverse direction off the scanner bed 1701; and
7. lowering the lift cam 8005 to its down position to wait for another drive/eject cycle.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. For example, in lieu of injection molded plastic, the chassis are amenable to sheet metal stamping or other known fabrication techniques. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. An automatic document feeder system for a flat bed computer input device having a horizontal document receiving surface and a horizontal supporting surface for the document feeder system, comprising:

a main chassis detachably mounted to said supporting surface;

said main chassis including a substantially vertical document input tray that is integral in one piece with main chassis;

said main chassis including in one piece means for defining an input paper path extending from said input tray to a document receiving area on the horizontal document receiving surface of the flat bed input device;

means mounted within said main chassis for transporting print media sheets along said input path;

a self aligning subjacent chassis for nesting with said main chassis to facilitate the positioning of a substantially vertical output tray that is integral in one piece with said subjacent chassis, said document output tray being substantially parallel to the input tray; and said subjacent chassis including means for defining an output paper path extending from the horizontal document receiving surface of the flat bed computer input device and vertically upward into said output tray.

2. The system as set forth in claim 1, comprising:

said means for transporting print media sheets is positioned for transporting print media sheets along said output paper path.

3. The system as set forth in claim 1, comprising:

a third chassis mounted on top of said main chassis frontally of said input tray, said third chassis including means for defining said input paper path in combination with said main chassis.

4. A removably mounted automatic document sheet feeder system for a flat bed scanning station, comprising:

a first unitary chassis, including an upstanding document input tray that is integral in one piece with said first unitary chassis;

a second unitary chassis mounted to said first unitary chassis forming a document sheet input paper path there between;

a third unitary chassis mounted to said first unitary chassis forming a document sheet output paper path there between;

an upstanding document output tray integral in one piece with said third unitary chassis;

wherein said output paper path and said input paper path are both substantially perpendicular to a horizontal plane of the flat bed scanning station; and wherein said first unitary chassis, said second unitary chassis, and said third unitary chassis in combination form a complete automat document feeder input-output paper path.

5. The system as set forth in claim 4, further comprising:

said input tray and said output tray each have a substantially vertical orientation for receiving document sheets along a lateral edge thereof.

6. The system as set forth in claim 4, comprising:

said input tray and said output tray are in a substantially parallel substantially vertical orientation to each other.

7. The system as set forth in claim 4, comprising:

said first chassis including mountings for all paper pick and paper drive mechanisms for sequentially picking document sheets from the input tray and delivering document sheets to and from the scanning station, and all mountings for motors and transmissions for driving said paper pick and paper drive mechanisms.

8. The system as set forth in claim 4, further comprising:

said first chassis having an aperture subjacent said input tray, and said second chassis is a unitary input paper path chassis mounted superiorly adjacent said aperture and in combination with said first chassis providing further input paper path definition.

9. The system as set forth in claim 4, the first chassis further comprising:

structural features formed for mounting a document backing assembly to the first chassis.

* * * * *

UNITED STATES PATENT AND TRADEMARK OFFICE
CERTIFICATE OF CORRECTION

PATENT NO : 6,022,012

DATED : February 8, 2000

INVENTOR(S) : A. Justin Worley

It is certified that error appears in the above-identified patent and that said Letters Patent is hereby corrected as shown below:

At column 5, line 26, after "601 (FIG.", delete "6" and insert in lieu thereof --6A--.

At column 7, line 46, after "to FIGS.", delete "-6B and 7A-7C" and insert in lieu thereof --7--.

At column 7, line 61, after "FIG.", delete "6B" and insert in lieu thereof --7--.

At column 8, line 2, after "shaft", delete "627" and insert in lieu thereof --2003(FIG.20)--.

At column 8, line 3, after "in", delete "FIGS.7A-7C" and insert in lieu thereof --FIG. 16--.

At column 8, line 3, after "628" insert --(FIG.9A)--.

At column 8, line 4, after "bearings" delete "618, 619, 620, 621".

At column 8, line 5, after "bushing" delete "615" and insert in lieu thereof --(not shown)--.

At column 8, line 5, after "622" and insert --(FIG.7)--.

At column 8, line 6, after "bushing" delete "623" and insert in lieu thereof --(not shown)--.

At column 8, line 8, after "631" delete "(FIGS.7B and 7C)" and insert in lieu thereof --(FIG.9A)--.

UNITED STATES PATENT AND TRADEMARK OFFICE
CERTIFICATE OF CORRECTION

PATENT NO : 6,022,012

DATED : February 8, 2000

INVENTOR(S) : A. Justin Worley

It is certified that error appears in the above-identified patent and that said Letters Patent is hereby corrected as shown below:

At column 8, line 10, after "633" insert --(FIG.2)--.

At column 8, line 11, after "611" insert --(FIG.6A)--.

At column 8, line 11, after "spring" delete "(FIG.7B and 7C)" and insert in lieu thereof --(not shown)--.

At column 8, line 12, after "in" delete "7C" and insert in lieu thereof --10A--.

At column 10, line 28, delete "12A" and insert in lieu thereof --12--.

Signed and Sealed this

Twenty-seventh Day of March, 2001

Attest:

NICHOLAS P. GODICI

Attesting Officer

Acting Director of the United States Patent and Trademark Office